United States Patent
Feng et al.

(10) Patent No.: US 6,326,326 B1
(45) Date of Patent: Dec. 4, 2001

(54) SURFACE FUNCTIONALIZED MESOPOROUS MATERIAL AND METHOD OF MAKING SAME

(75) Inventors: Xiangdong Feng; Jun Liu, both of West Richland; Glen E. Fryxell, Kennewick, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/020,028

(22) Filed: Feb. 6, 1998

(51) Int. Cl.$^7$ ............................................... B01J 29/04
(52) U.S. Cl. ............................. 502/62; 502/60; 502/63; 502/64; 502/65; 423/701; 423/705; 423/708
(58) Field of Search ..................... 423/701, 705, 423/708; 502/60, 62, 63, 64, 65

(56) References Cited

U.S. PATENT DOCUMENTS

| | | | |
|---|---|---|---|
| 3,608,610 | 9/1971 | Greatorex et al. | 159/13 |
| 4,975,406 | 12/1990 | Frestad et al. | 502/302 |
| 5,145,816 | * 9/1992 | Beck et al. | 502/60 |
| 5,264,203 | 11/1993 | Beck et al. | 423/703 |
| 5,270,127 | 12/1993 | Koga et al. | 429/17 |
| 5,342,521 | 8/1994 | Bardot et al. | 210/490 |
| 5,385,712 | 1/1995 | Sprunk | 422/190 |
| 5,387,398 | 2/1995 | Mueggenburg et al. | 422/168 |
| 5,422,331 | 6/1995 | Galligan et al. | 502/333 |
| 5,426,442 | 6/1995 | Haas | 343/778 |
| 5,518,697 | 5/1996 | Dalla Betta et al. | 422/173 |
| 5,645,891 | 7/1997 | Liu et al. | 427/376.2 |
| 5,690,763 | 11/1997 | Ashmead et al. | 156/60 |
| 5,690,900 | 11/1997 | Smojver | 423/392 |
| 5,811,062 | 9/1998 | Wegeng et al. | 422/129 |

FOREIGN PATENT DOCUMENTS

| | | | |
|---|---|---|---|
| 0 308 976 | 9/1988 | (EP) | 3/34 |
| 0 574 012 | 6/1993 | (EP) | 37/2 |
| 1-226713 | * 9/1989 | (JP) . | |
| WO 96/32188 | 10/1996 | (WO) | 8/2 |

OTHER PUBLICATIONS

"Functionalized Monolayers on Ordered Mesoporous supports." Feng, X, et al. Science, 1997, 276, pp. 923–926.*
"Hybrid Mesoporous Materials with Functionalized Monolayers." Liu, J, et al. Chemical Engineering & Technology, 1998, 1/98, pp. 96–100.*
OY Podyacheva et al., "*Metal Foam Supported Perovskite Catalysts*", p. 243–250. 1997.
AN Lenov et al., "*Monolithic Catalyst Supports With Foam Structure*", p. 259–267. 1997.
AY Tonkovich et al., "*Active Microchannel Heat Exchanger*" (E–1581 Application), p. 1–27. 1997.
AY Tonkovich et al., "*Microchannel Chemical Reactors for Fuel Processing*", p. 186–195. 1998.
AY Tonkovich et al., "*The Catalytic Partial Oxidation of Methane in a Microchannel Chemical Reactor*", p. 45–53. 1998.

(List continued on next page.)

Primary Examiner—Steven P. Griffin
Assistant Examiner—Christina Ildebrando
(74) Attorney, Agent, or Firm—Paul W. Zimmerman

(57) ABSTRACT

According to the present invention, an organized assembly of functional molecules with specific interfacial functionality (functional group(s)) is attached to available surfaces including within mesopores of a mesoporous material. The method of the present invention avoids the standard base soak that would digest the walls between the mesopores by boiling the mesoporous material in water for surface preparation then removing all but one or two layers of water molecules on the internal surface of a pore. Suitable functional molecule precursor is then applied to permeate the hydrated pores and the precursor then undergoes condensation to form the functional molecules on the interior surface(s) of the pore(s).

28 Claims, 10 Drawing Sheets

OTHER PUBLICATIONS

Chemical Engineering Progress, "Big Opening Seen for Microchannels", p. 1–5. Apr. 1998.

EA Polman et al., "Novel Compact Steam Reformer for Fuel Cells with Heat Generation By Catalytic Combustion Augmented by Induction Heating", p. 347–351. 1999.

T Inui et al., Catalytic Combustion of Natural Gas As The Role of On–Site Heat Supply in Rapid Catalytic $CO_2$–$H_2O$ Reforming of Methane, p. 295–203. 1995.

AM Adris et al., "On The Reported Attempts to Radically Improve The Performance Of The Steam Methane Reforing Reactor", p. 177–186. 1996.

AN Pestryakov et al., "Foam–Metal Catalysts With Supported Active Phase For Deep Oxidation Of Hydrocarbons", p. 167–172. 1995.

AY Tonkovick et al., "Microchannel Chemical Reactors for Fuel Processing Applications I. Water Gas Shift Reactor", p. 2947–2951. 1999.

AY Tonkovick et al., "Microchannel Chemical Reactors for Fuel Processing Applications II. Compact Fuel Vaporization", p. 18. PNNL. No date available.

ZR Ismagilov et al., "Development and Study of Metal Foam Heat–Exchanging Tubular Reactor: Catalytic Combustion of Methane Combined With Methane Steam Reforming", p. 2759–2764. 2000.

JR Kosak, "A Novel Fixed Bed Catalyst for the Direct Combination of $H_2$ and $O_2$ to $H_2O_2$", p. 115–124. 1995.

MV Twigg et al., "Metal and Coated–Metal Catalysts", p. 59–90. No date available.

AJ Franz et al., "New Operating Regimes and Applications Feasible With Microreactors", p. 33–38. 1997.

G. Weissmeier et al., "Microreaction Technology: Development of a Micro Channel Reactor and Its Application in Heterogeneously Catalyzed Hydrogenations", p. 152–153. 1998.

G. Weissmeier et al., "Strategy, for the Development of Micro Channel Reactors for Heterogeneously Catalyzed Reactions", p. 24–32. 1998.

H Löwe et al., "Microreactor Concepts for Heterogeneous Gas Phase Reactions",p. 63–74. 1997.

Lim et al. "Synthesis and Characterization of a reactive Vinyl–Functionalized MCM–41: Probing the internal Pore Structure by a Bromination Reaction", Apr. 30, 1997; J. Am. Chem. Soc. 119, pp 4090–4091.*

Burkett et al. "Synthesis of hybrid inorganic–organic mesoporous silica by co–condensation of siloxane and organosiloxane precursors", Jun. 6, 1996; Chem. Commun. 11, pp 1367–1368.*

Brunel et al. "MCM–41 type silicas as supports for immobilized catalysts", Zeolites: A Refined Tool for designing Catalytic Sites, 1995, pp 173–180.*

Cauvel et al. "Functionalization of Y zeolites with organosilane reagents", Studies in Surface Science and Catalysis, vol. 94, pp 286–293. No date available.*

Fowler et al., "Synthesis and Characterization of ordered organo–silica–surfactant mesophases with functionalized MCM–41–type architecture", Sep. 21, 1997, Chem. Commun. 18, pp 1769–1770.

Itoh et al., "Synthesis and Application of New Phenyl–Functionalized Zeolites as Protection Against Radical Bromination at the Benzylic Position", 1997, Synlett pp 1450–1452.

Li et al. "Synthesis of zeolites using organosilicon compounds as structure–directing agents", 1994, Microporous Materials 3, pp 117–121.

Lim et al. "Synthesis of Ordered Microporous Silicates with Organosulfur Surface Groups and Their Application as Solid Acid Catalysts", Jan. 1998, Chem. Mater. 10, pp 467–470.

Liu et al., "Hybrid Mesoporous Materials with Functionalized Monolayers", 1998, Adv. Mater. 10 (2) pp 161–165.*

Macquarrie et al., "Aminopropylated MCMs as base catalysts: a comparison with aminopropylated silica", 1997, Chem. Commun. pp 1781–1782.*

Maeda et al., "Synthesis of the First Microporous Aluminum Phosphonate with Organic Groups Covaently Bonded to the Skeleton", 1994, Angew. Chem. Int. Ed. Engl. 33 (22), pp 2335–2337.*

Maeda et al., "Synthesis of a novel microporous crystal with organic groups covalently bonded to the skeleton", 1995, Studies in Surface Science and Catalysis 98, pp 44–45.*

Subba Rao et al. "1,5,7–Triazabicyclo[4.4.0]dec–5–ene Immobilized in MCM–41: A Strongly Basic Porous Catalyst", 1997, Angew. Chem. Int. Engl. 36 (23), pp 2661–2662.*

Recent Advances in the Synthesis, Characterization and Applications of Mesoporous Molecular Sieves, JS Beck, JC Vartuli, Solid Catalysts & Porous Solids, pp 76–87. No date available.

Nucleophilic Displacements in Mixed Self–Assembled Monolayers, GE Fryxell et al., Langmuir 1996, 12, 5164–5075.

Surface Absorption of Monolayers, A. Ulman, MRS Bulletin, Jun. 1995.

Self–Assembling Materials, G. Whitesides, Scientific American, Sep. 1995.

Removal of Cadmium, Lead, Mercury, Tin, Antimony, and Arsenic From Drinking and Seawaters by Colloid Precipitate Floatation, SE Ghazy, Separation Science and Technology, 30(6), pp. 933–947, 1995.

Mercury Removal From Aqueous Streams Utilizing Microemulsion Liquid Membranes, KA Larsen, JM Wiencek, Environmental Progress (vol. 13, No. 4), Nov. 1994.

Removal of Mercury Vapor From Air With Sulfur–Impregnated Adsorbents, Y. Otani et al., Environ. Sci. Technol. vol. 22, No. 6, 1988.

Removal of Mercury From Waste Water: Large–Scale Performance on an Ion Exchange Process, JA Ritter, JP Bibler, Mat. Sci. Tech. Bol. 25, No. 3, pp. 15–172, 1992.

Electrokinetic Remediation of Mercury–Contaminated Soils Using Iodine/Iodide Lixiviant, CD Cox et al., Environmental Science & Technology, Bol 30, No. 6, 1995.

Distributions of 14 Elements on 60 Selected Absorbers From Two Simulant Solutions (Acid–Dissolved Sludge and Alkaline Supernate) for Hanford HLW Tank 102–SY, LA–12654, Los Alamos National Laboratory. No date available.

Removal of Gaseous Mercury From Air Using a Gold Coated Denuder, J Munthe et al., Atmospheric Environment vol. 24A, No. 8, pp. 2271–2274, 1990.

* cited by examiner (b) 76% Coverage (c) Hg loaded 76% SFMM

SURFACE FUNCTIONALIZED MESOPOROUS MATERIAL AND METHOD OF MAKING SAME

This invention was made with Government support under Contract DE-AC0676RLO-1830 awarded by the U.S. Department of Energy. The Government has certain rights in the invention.

FIELD OF THE INVENTION

The present invention relates generally to a surface functionalized mesoporous material (SFMM) and method of making same. More specifically, the SFMM has an ordered or organized array of functional molecules containing specific functional groups, with the functional molecules attached to the available surface area of the mesoporous substrate. The surface functionalized mesoporous material is useful for but not limited to chemical separations, chemical delivery, and catalysis. As used herein the term "monolayer molecule(s) is a subset of "functional molecule(s)" both including organic, inorganic molecules and combinations thereof. An assembly or array of functional molecule(s) may include one (mono) or more (multi) layers of functional molecules. Within the category of organic molecules are included straight chain hydrocarbons, organometallics, and combinations thereof.

BACKGROUND OF THE INVENTION

Chemical separations, chemical delivery and catalysis have all experienced improvements when accomplished at the mesoporous scale. However, widespread commercial use of mesoporous materials has been limited because mesoporous materials lack specific functionality on their surfaces. Mesoporous materials FIG. 1a are made of a solid substrate 100 that has been templated to form mesopores 102 which are pores having a diameter or characteristic cross section dimension from about 1.3 nm to about 50 nm.

Surface functionalized materials have also been proposed for chemical separations. Functional molecules FIG. 1b are formed on a substrate 110 wherein functional molecules 112 are attached to the substrate 110 with an attaching group 114, usually a siloxane group. The terminal end of the functional molecule may have a functional group 116 that binds to the chemical of interest for separation. The performance of surface functionalized materials is limited by (1) surface area of the substrate 110 and (2) the functional group density or coverage of the substrate surface area.

Attaching organosilanes on a ceramic oxide surface involves a complex series of reversible and irreversible chemical processes. In order for these molecules to bind to the ceramic surface, it is critical that either the surface or the organosilane be in appropriate (hydroxylated) chemical form to undergo the condensation chemistry necessary for the anchoring process. This can be accomplished in one of several ways, and water is critical to all of them.

In the usual method of attaching functional molecules on glass or silicon wafers, the substrate is cleaned and hydrated in such a way that virtually all of the silicon atoms on the surface bear a hydroxyl group (such a group is called a surface silanol). This level of coverage amounts to approximately $5 \times 10^{18}$ silanols per square meter. In addition, due to the hydrophilicity of this interface and the fact that the cleaning process is usually carried out in aqueous media, there is usually a significant amount of water associated with the silanol interface. Exposure of such an interface to a solution of organosilanes (e.g. alkoxy, chloro, etc.) results in hydrolysis of the silane to afford the corresponding hydroxysilane, which is strongly hydrogen bound to the hydrated silica surface. This hydroxysilane then undergoes facile condensation with the neighboring surface silanol, resulting in covalent attachment of the organosilane to the silica surface. Any remaining chlorides or alkoxides on the organosilane can also undergo similar hydrolysis (secondary hydrolysis) and condensation to provide crosslinking between the silane molecules bound to the silica surface. This crosslinking significantly enhances the stability of the monolayer coating by linking adjacent silanes to one another, thereby providing secondary points of attachment.

If the cleaned silica surface is dried, then reaction of the organosilane can take place directly with the surface silanols. However, since the surface silanols are substantially less nucleophilic than water and there is a significant kinetic barrier for this reaction, this chemistry is very slow and inefficient relative to the hydrolysis/condensation chemistry described above. In addition, the lack of surface water precludes any secondary hydrolysis and condensation, thereby preventing any crosslinking. Thus, the monolayers obtained by this method are less stable and therefore of lesser quality.

The calcination step in the preparation of the mesoporous silica severely desiccates the silica surface, both in terms of adsorbed water molecules and in terms of surface silanols. All surface water is removed during the calcination step, and the vast majority of surface silanols undergo condensation to form siloxane bridges, leaving only a small number of isolated silanols. Based on our experiments, we estimate this number of remaining silanols to be about only 10% of the silicon atoms on the surface, or about $5 \times 10^{17}$ silanols per square meter.

Mesoporous materials have been made according to methods set forth in U.S. Pat. Nos. 5,264,203, 5,098,684, 5,102,643, and 5,238,676 (Mobil Oil Corporation, Fairfax, Va.) as well as U.S. Pat. No. 5,645,891 (Battelle Memorial Institute, Richland, Wash.)

In the Mobil patents, a calcined silica surface is treated with an organosilane with no water present to induce hydrolysis of the silane. The only nucleophiles present capable of reaction with the silane are the small number of silanols left on the surface after the calcination process. This limits surface coverage to approximately $5 \times 10^{17}$ organosilanes per square meter (approximately 10% of available silanols). In addition, since there is no water present for secondary hydrolysis and condensation, there can be no crosslinking to enhance the stability of the monolayer.

The Mobil patents report derivatizing 90% of the available silanols. It is critical to note, however, that their work was performed on a calcined silica surface with no added water. Therefore, there were very few silanols (approximately $5 \times 10^{17}$ per square meter) and no water on the silica surface. They were successful in derivatizing 90% of these silanols, incorporating approximately $4.5 \times 10^{17}$ silanes per square meter or only about 9% of the silicon atoms on the surface. Again, since there was no water on the surface, no secondary hydrolysis could take place, so there could be no stability-enhancing crosslinking of the monolayer.

Accordingly, there is a need for mesoporous materials with greatly increased number of the functional molecules to greatly increase the separative, catalytic and chemical delivery capability of mesoporous materials.

Chemical separations are relied upon in a wide range of industries. Various industrial, military, agricultural, medical and research activities have resulted in severe contamination, especially metal contamination, of the environment. Chemical separations are particularly useful for cleanup and remediation of contaminated waste sites. In the case of mercury, contamination may be from fossil fuel combustion; chlorine, caustic soda cement, and lime production; waste and sewage sludge incineration; and mining and benificiation operations. Contamination may be present in the air, water, sludge, sediment, and soil.

Mercury appears in three primary forms:
(1) metallic mercury: $Hg^0$,
(2) inorganic mercury: divalent mercury, $Hg^{2+}$; monovalent mercury, $Hg_2^{2+}$; neutral mercury compounds, $HgCl_2$, $Hg(OH)_2$ and
(3) organic mercury: phenylmercury, $C_6H_5Hg^+$, $C_6H_5HgC_6H_5$; alkoxyalkyl mercury, $CH_3O$—$CH_2$—$CH_2$—$Hg^+$; methylmercury, $CH_3Hg^+$, $CH_3HgCH_3$.

These compounds can be ranked in order of decreasing toxicity as: methylmercury, mercury vapor, inorganic salts of mercury and a number of organic forms such as phenylmercury salts (Mitra, Mercury in the Ecosystem, 1986, Trans Tech Publications). Methylmercury, the most toxic form, is formed mainly by methylation of mercury by methanogenic bacteria which are widely distributed in the sediments of ponds and in the sludge of sewage beds. In addition, methylation was used as a seed-dressing preparation in agriculture. The symptoms of mercury poisoning in humans includes: digestion disturbances, emaciation, diarrhea, speech stammering, delirium, paralysis of the arms and legs, and death by exhaustion.

The importance of mercury contamination is underscored by the fact that the U.S. Department of Energy (DOE) has identified the removal/separation/stabilization of mercury as the first and fourth priorities among 30 prioritized technology deficiencies in the cleanup of past weapons production activities (X. Feng, J. Liu, and G E Fryxell, "Self-Assembled Monolayers on Mesoporous Supports (SAMMS) for RCRA Metal Removal," Proceedings of the Efficient Separations and Processing Crosscutting Program 1997 Technical Exchange Meeting, Jan. 28–30, 1997, Gaithersburg, Md., p. 5.15–5.20, 1997). Over 50,000 $m^3$ of mixed low-level and transuranic waste-containing mercury has been identified in the DOE complex. Mercury-bearing DOE wastes are aqueous and non-aqueous liquids, sludges, soils, absorbed liquids, partially or fully stabilized sludges, and debris. Many wastes, including DOE wastes, contain mercury in amounts of less than 260 ppm; these wastes are not required to be treated by retorting as specified by the Environmental Protection Agency (EPA) regulation for mercury. However, these wastes contain other contaminants that require treatment, and the presence of mercury complicates the design of offgas systems, stabilization of residues, and monitoring of all effluents. Thus, it would be advantageous to remove the mercury in a pretreatment process to simplify downstream operation.

The existing technologies for metal and mercury removal from diluted wastewater include activated carbon adsorption, sulfur-impregnated activated carbon, microemulsion liquid membranes, ion exchange, and colloid precipitate flotation. These technologies are not suitable for sludge treatment because of poor metal loading (e.g., metal uptake less than 20% of the mass of the adsorber material) and selectivity, (interference from other abundant ions in groundwater). Furthermore, they lack stability for metal-laden products so that they are not disposable directly as a permanent waste form. As a result, secondary treatment is required to dispose or stabilize the separated mercury or the mercury-laden products. Mercury removal from nonaqueous sludge, adsorbed liquids, or partially- or fully-stabilized sludges, and mercury-contaminated soil is difficult because (1) the nonaqueous nature of some wastes prevents the easy access of leaching agents, (2) some waste streams with large volumes make the thermal desorption process expensive, and (3) the treatment of some waste streams are technically difficult because of the nature of the wastes.

Mercury removal from offgas in vitrifiers and in mercury thermal desorption processes is usually accomplished through active carbon adsorption. However, the carbon-based adsorbents are only effective enough to remove 75 to 99.9% of the mercury with a loading capacity equivalent to 1–20% of the mass of the adsorber material. A last step, mercury amalgamation using expensive gold, usually is needed to achieve the EPA air release standard. A carbon bed usually is used later in the offgas system, where the temperature is generally lower than 250° F. In the sulfur impregnated carbon process, mercury is adsorbed to the carbon which is much weaker than the covalent bond formed with SFMM. As a result, the adsorbed mercury needs secondary stabilization because the mercury-laden carbon does not have the desired long-term chemical durability due to the weak bonding between the mercury and active carbon. In addition, a large portion of the pores in the active carbon are large enough for the entry of microbes to solubilize the adsorbed mercury-sulfur compounds. The mercury loading is limited to about 0.2 g/g of the materials.

The microemulsion liquid membrane technique uses an oleic acid microemulsion liquid membrane containing sulfuric acid as the internal phase to reduce the wastewater mercury concentration from 460 ppm to 0.84 ppm. However, it involves multiple steps of extraction, stripping, demulsification, and recovery of mercury by electrolysis and uses large volumes of organic solvents. The liquid membrane swelling has a negative impact on extraction efficiency.

The slow kinetics of the metal-ion exchanger reaction requires long contacting times. This process also generates large volumes of organic secondary wastes. One ion exchange process utilizes Duolite™ GT-73 ion exchange organic resin to reduce the mercury level in wastewater from 2 ppm to be below 10 ppb. Oxidation of the resin results in substantially reduced resin life and an inability to reduce the mercury level to below the permitted level of less than 0.1 ppb. The mercury loading is also limited because the high binding capacity of most soils to mercury cations makes the ion-exchange process ineffective, especially when the large amounts of $Ca^{2+}$ from soil saturate the cation capacity of the ion exchanger. In addition, the mercury-laden organic resin does not have the ability to resist microbe attack. Thus, mercury can be released into the environment if it is disposed of as a waste form. In addition to interference from other cations in the solution besides the mercury-containing ions, the ion exchange process is simply not effective in removing neutral mercury compounds, such as $HgCl_2$, $Hg(OH)_2$, and organic mercury species, such as methylmercury, which is the most toxic form of mercury. This ion-exchange process is also not effective in removing mercury from nonaqueous solutions and adsorbing liquids.

The reported removal of metal from water by colloid precipitate flotation reduces mercury concentration from 160 ppb to about 1.6 ppb. This process involves the addition of HCl to adjust the wastewater to pH 1, addition of $Na_2S$ and oleic acid solutions to the wastewater, and removal of colloids from the wastewater. In this process, the treated wastewater is potentially contaminated with the $Na_2S$, oleic acid, and HCl. The separated mercury needs further treatment to be stabilized as a permanent waste form.

Acidic halide solution leaching and oxidative extractions can also be used in mobilizing mercury in soils. For example $KI/I_2$ solutions enhance dissolution of mercury by oxidization and complexation. Other oxidative extractants based on hypochlorite solutions have also been used in mobilizing mercury from solid wastes. Nevertheless, no effective treatment technology has been developed for removing the mercury contained in these wastes. Since leaching technologies rely upon a solubilization process wherein the solubilized target (e.g. mercury) reaches a dissolution/precipitation equilibrium between the solution and solid wastes, further dissolution of the contaminants from the solid wastes is prevented once equilibrium is reached. In addition, soils are usually a good target ion absorber that inhibits the transfer of the target ion from soils to solution.

No existing technologies have been developed for removing mercury from pump oil. Some preliminary laboratory studies of a zinc powder/filtration process was carried out at the DOE Pantex Plant showing a partial removal of mercury, but the work was discontinued.

The removal of mercury from nonaqueous liquids, adsorbed liquids, soils, or partially-or-fully-stabilized sludge at prototypic process rates has not been demonstrated. This is mainly because the mercury contaminants in actual wastes are much more complicated than the mercury systems addressed by many laboratory-scale tests that are usually developed based on some simple mercury salts. The actual mercury contaminants in any actual wastes almost always contain inorganic mercury (e.g., divalent cation $Hg^{2+}$, monovalent $Hg_2^{2+}$, and neutral compounds such as $HgCl_2$, $Hg[OH]_2$,); organic mercury, such as methylmercury (e.g., $CH_3HgCH_3$ or $CH_3Hg^+$) as a result of enzymatic reaction in the sludge; and metallic mercury, because of reduction. Since many laboratory technologies are developed for only one form of mercury, demonstrations using actual wastes are not be successful.

Treatment of mercury poisoning with mercaptan related compounds as medicines has been effectively demonstrated (Mitra, Mercury In The Ecosystem, 1986, Trans Tech).

Other metals that are of interest for remediation and industrial separations include but are not limited to silver, lead, uranium, plutonium, neptunium, americium, cadmium and combinations thereof. Present methods of separation include but are not limited to ion exchangers, precipitation, membrane separations, and combinations thereof. These methods usually have the disadvantages of low efficiencies, complex procedures, and high operation costs.

Inorganic anions are also of interest for separations and include but are not limited to $TcO_4^-$, $CrO_4^{-2}$, and $AsO4^{-3}$. Present methods for anion separation include commercial anion exchanger resin such as Sybron™, JK-2, and Crypt-DER and by supramolecules such as a metalated cyclotriveratrylene. However, these methods usually have low selectivity, low capacity, and high operation cost.

Thus, in addition to the need for mesoporous materials with greatly increased number of functional molecules for binding mercury and other metals, there remains a need for materials and methods for separations that have high selectivity, high loadings, and that do not require secondary treatment. In the case of mercury, there remains a specific need for separations of mercury from complex mixed waste compounds and for mercury removal from pump oil.

SUMMARY OF THE INVENTION

According to the present invention, an organized assembly of functional molecules (monolayer or multilayer) with specific interfacial functionality (functional group(s)) is attached to the available surface area of a mesoporous material. The method of the present invention avoids the standard base soak that would digest the walls between the mesopores. Increased surface coverage of the monolayer is achieved by hydrating the mesoporous material prior to introducing the functional molecules.

The presence of the appropriate amount of water is critical for effecting complete surface coverage in an ordered monolayer assembly (characterized by coverage greater than 10% ($>0.5 \times 10^{18}$ silanes per square meter) of the silicon atoms on the surface up to approximately $5 \times 10^{18}$ silanes per square meter, or 10–100% of the silicon atoms on the surface), as well as making possible the silane-silane crosslinking that increases monolayer stability. The distinction the present invention provides is an unexpectedly higher surface population of the functional reagent or functional molecules, up to a factor of 10 higher, and an attached organized assembly that is crosslinked, enhancing its thermal and chemical stability.

The surface functionalized mesoporous material permits separations of a target material or species (especially metal (s)) from solids, liquids and gases. The target-laden material is regenerable by acid and by light, for example mercury-excited light.

Advantages of the present invention for mercury separations include (1) a cost-effective approach compared to baseline stabilization processes, such as the sulfide-salt method and sulfur polymer cement stabilization; (2) similar or better affinity for mercury compared to sulfide salt, and (3) a much more inert and more stable form than mercury sulfide which is known to be easily oxidized by air and releases mercury in an acidic condition.

Further advantages are realized with usage of SFMM in the treatment of offgas including (1) separation efficiency more than 99.9% to achieve direct offgas release standards at a potentially far lower cost; (2) the target capacity of SFMM is greater than 20% leading to reduced final waste volumes; (3) the target-loaded SFMM can be directly disposed economically as a waste form; and (4) regeneration of SFMM is not necessary thereby reducing the life-cycle cost and operating complexity of the waste treatment because of elimination of a regeneration step. Further, it also reduces radiation exposure to operators if the waste is radioactive.

Specific advantages with respect to mercury removal from soils and sludges include 1) increased driving force for mercury solubility (the SFMM keeps the mercury concentration in solution at ppb level), 2) only one application of a smaller volume of lixiviant solution is needed in the SFMM Assisted Dynamic Leaching Process, 3) spent lixiviant solutions do not need further treatment because the mercury content in the lixiviant solution is extremely low, and 4) the separated mercury does not need secondary treatment since mercury-loaded-SFMM passes Toxic Characteristic Leach Procedure (TCLP) tests.

It is expected that the economic and performance advantages of SFMM for mercury are also achieved for metals that have similar binding characteristics with the functionalized surface. Examples include but are not limited to Cu, Cd, Ag, Pb, and Eu. It is further expected that the advantages noted for mercury would be applicable to other metals (e.g. Cr, Ni, Co) using different functional groups including but not limited to polycarboxylic acids, for example EDTA, ethylenediamine, bipyridyl, phenanthroline, phenols, polyhydroxyaromatic, carbonyl compounds, phosphine, phosphine oxide, isonitrile and combinations thereof. Other target materials include arsenic, bismuth, plutonium, ruthenium, and combinations thereof.

To the extent that a target material may have value, the target material may further be separated from the SFMM with a washing agent. The washing agent is a solvent including but not limited to acid, base, complexing agent or combination thereof. A preferred acid is hydrochloric acid.

Alternatively the SFMM with or without target material may be enclosed in another material, including but not limited to for example polymer, glass, metal ceramic and combinations thereof. The SFMM materials may also be utilized for delivering a target material as desired molecules such as drugs, biocides, catalysts and combinations thereof. Biocide is herein defined to include bioactive agents characterized as herbicide, pesticide, fungicide, but not limited to these. For instance, the SFMM materials can meet two requirements for the release of pheromone-like agents for pest control: sustained release and timed release. Effective delivery of biotic agents like pheromones have the potential for reduced environmental damage and enhanced ability to produce, store, ship, and trade agricultural products. Currently, most delivery devices are based on polymeric matrices or membranes, which often do not satisfy long-term release requirements for pheromone applications. State-of-the-art open structured polymers usually lose the volatile chemicals rapidly because of the large pore size, and denser polymers can not be impregnated by the pheromone. Materials made according to the present invention have cylindrical pore channels of precisely the same size, and the pore diameter can be currently tailored from 1 to 50 nm, thereby serving as a better reservoir for the volatile chemicals. In certain applications, it is desired to have a biocide that is not released to serve as a barrier, for example a termite barrier that termites will not pass because of the presence of a termiticide, but which does not degrade over time because the termiticide is held and not substantially released from a polymer sheet.

Sustained release will be achieved by selecting the pore diameter appropriate for the molecular binding between a particular biocide and the matrix. Furthermore, a timed-release mechanism can be designed by combining the porous matrix with or within thermal or other environmentally-sensitive polymers so that the release will only be triggered under desired conditions.

Similar delivery devices may be designed for delivery of drugs and hormones such as insulin used by diabetics. Again, the pore size and pore shape of the SFMM is selected to fit those of the different drugs and hormones and the functional groups are made pH and condition sensitive for achieving the desired delivery. SFMM pore shape includes but is not limited to cylindrical having any cross-section (e.g. circular, non-circular), and spherical with holes (mesopores) through a spherical shell (e.g. wiffle ball).

The high population density of the surface functional groups on SFMM further permits uniformly binding, at an atomic level, specific metals including but not limited to Pt, Rh, Ru, Ni, and combinations thereof that have specific catalytic activity to a high surface area inorganic matrix, resulting in high capacity and high activity catalysts.

It is an object of the present invention to provide a mesoporous material having a specific interfacial functionality attached to the available surface of the mesoporous material.

It is a further object of the present invention to provide a method of installing the functional groups onto the available surface of the mesoporous material.

It is a further object of the present invention to provide a material and method for separating complex mixtures of compounds.

It is a further object of the present invention to provide a material and method for chemical delivery.

It is a further object of the present invention to provide a material for catalysis.

It is a further object of the present invention to provide a material and method for removing a metal and/or metal compound from oil, aqueous systems, sludges, soils and combinations thereof.

It is an object of the present invention to provide a material useful as a waste form for metal separation that can be disposed of without further treatment.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(s)

Figure 1A:
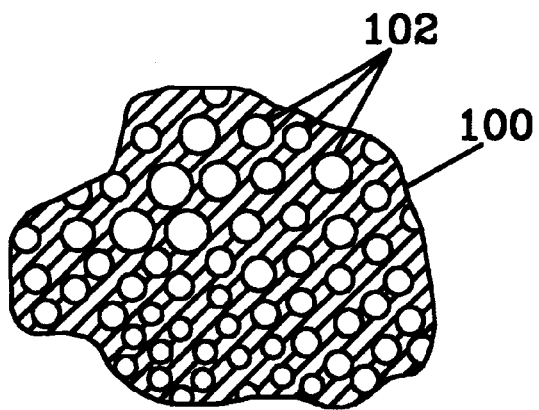
FIG. 1a is a cross section of a mesoporous material (prior art).
Figure 1B:
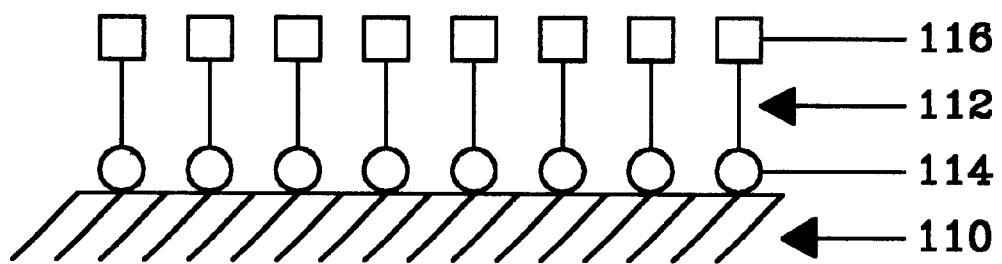
FIG. 1b is a cross section of a self assembled monolayer (prior art).
Figure 2:
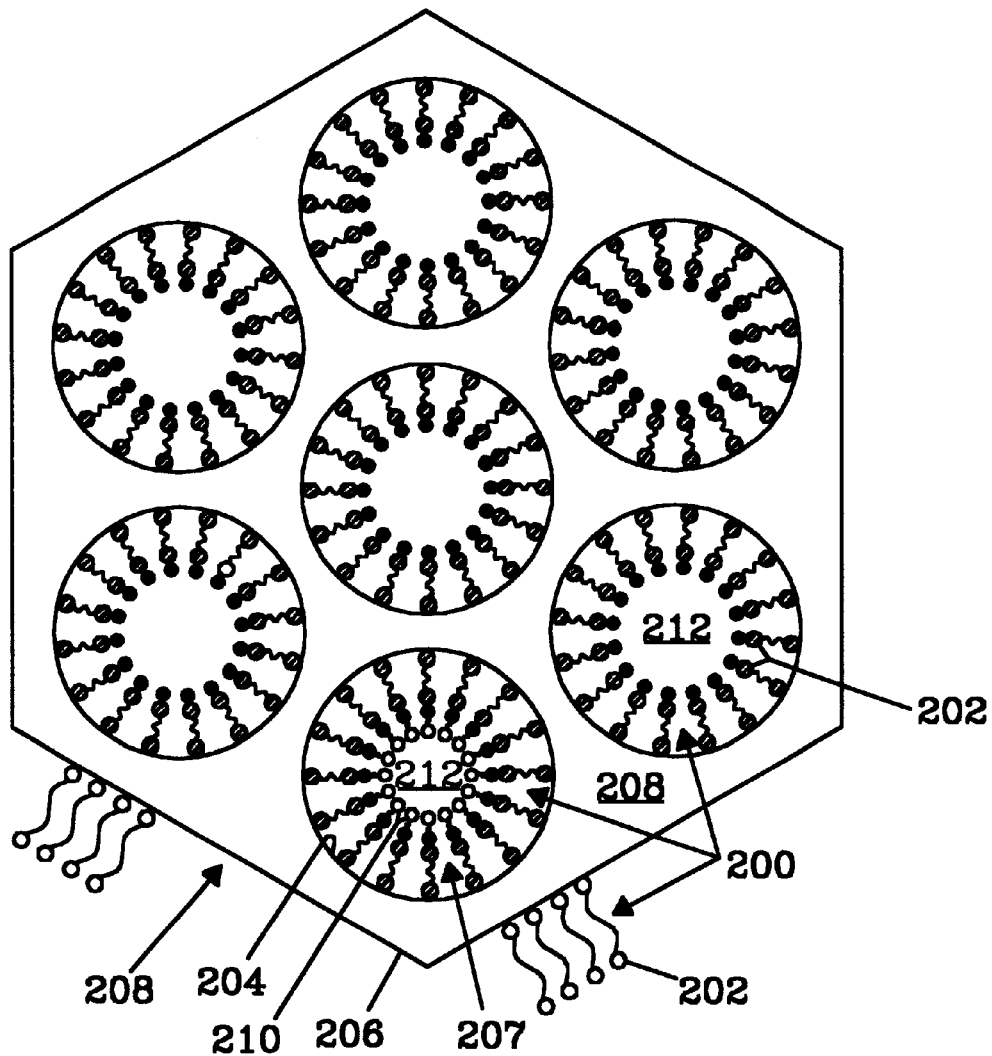
FIG. 2 is a cross section of an SFMM.

According to the present invention, (see FIG. 2) an organized assembly of functional molecules 200 containing a functional group 202 on a terminal end, is attached to available surface with an attaching group, the available surface includes interior surfaces 204 of mesopores 207, and exterior surfaces 206, of a mesoporous material 208. The method of the present invention has the step of hydrating or rehydrating the silica surface so that silane hydrolysis and condensation can take place. The silane hydrolysis and condensation are critical to obtain the surface derivatization with the organized assembly of functional molecules 200. Hydration is necessary because the surface of the mesoporous material is initially substantially devoid of surface silanol groups and water molecules. A solution of functional precursors is then introduced and the functional precursors then undergo condensation reactions onto the mesopore surface. A functional precursor molecule 112 has the attaching group 114, a linker molecule, and a functional group 116. More specifically, the surface functionalized mesoporous material of the present invention may be characterized by a mesoporous material 208 having (a) a surface to mass ratio or surface area to mass ratio of at least about 200 $m^2$/g, and (b) a first plurality of functional molecules 200 containing functional groups 202 on terminal ends, with attaching ends with attaching groups attached to the available surface 204, wherein a ratio of the number of functional molecules to mass of the substrate is at least about $5(10^{20})$ molecules/g. Or, an amount of the first plurality of functional molecules upon said available surface area is greater than 10% of a total possible number of functional molecules attachable to the available surface area. The terms "available surface" or "available surface area" are interchangeable and are used to recognize that there may be surface area in a very small pore that is not accessible by the functional molecule and thereby unavailable for receiving a functional molecule.

Attaching groups include but are not limited to siloxane (SiO), silicon carbide (SiC), ionic, for example acidity of OH group, chlorosilanes, phosphates, carboxylates, hydroxamic acids, amines, thiols, alcohols, and combinations thereof. Siloxane is preferred for attaching to silica. For attaching to a ceramic oxide mesoporous material (e.g. $SiO_2$), attaching groups of siloxane, chlorosilane, metal phosphate, caboxylate, amine, phenol, alcohol and combinations thereof may be used. For mesoporous material of metal oxide, the attaching group is metal phosphate, hydoxamic acid, carboxylate, thiol, amine and combinations thereof. For a mesoporous material of metal, the attaching group is thiol, amine and combinations thereof. For a mesoporous material of an activated polymer, the attaching group is a chlorosilane.

The linker molecule may include organic, for example straight chain hydrocarbons, organometallic, inorganic molecules, for example calcium carbonate, and combinations thereof.

Functional groups may be interfacial functional groups for attaching additional functional molecules. Functional groups may also be a terminal group with a specific selectivity for binding a target material or compound. Target materials include but are not limited to metal, organic liquid, and combinations thereof. These may be in physical forms of vapor, aqueous solution, sludge, solid or combinations thereof. Organic liquid includes but is not limited to trichloroethylene, oil, benzene, and combinations thereof.

In a preferred embodiment, the plurality of mesopores is substantially monodisperse. Addition of the plurality of functional molecules imparts elasticity to the plurality of mesopores. Although the substrate mesoporous material is substantially mechanically rigid, the functional molecules (especially organic molecules) are often mechanically less rigid thereby permitting the open pore to be elastic. Pore properties of geometry, shape and diameter of open pore space, pore wall thickness, as well as mechanical stiffness or rigidity are variable. For example, a second plurality of functional molecules 210 may be attached to the first plurality of functional molecules (monolayer) and extending therefrom (multilayer). The length of a plurality of functional molecules may be at least about 1 Angstroms. Multilayers may be from 2 to 40 multilayers, with 2–5 preferred as a practical limit within a mesopore. A preferred functional molecule is a molecule having a backbone that is usually a carbon chain having a length from one (1) to many carbon atoms. Lengths of up to 18 carbon atoms have been confirmed. It is preferred that the functionalized interior surface defines an open pore 212 having a diameter of at least 1 Angstrom.

The surface functionalized mesoporous material (SFMM) is useful for (1) binding of different form(s) of metal including but not limited to, elemental metals and alloys, inorganic, organic, charged, and neutral compounds; and (2) removing the different form(s) from both aqueous and organic mixtures. The metal-laden SFMM passes Toxic Characteristic Leach Procedure (TCLP) tests, and also has good long-term durability as a waste form because the covalent binding between the metal and the functional group leads to good resistance to ion- exchange, oxidation, and hydrolysis. Additional advantages include (1) the uniform and small pore size (<50 nm) of the mesoporous substrate prevents bacteria (>2000 nm) from solubilizing the bound metal; and (2) SFMM can be used to remove metals from liquids, gases, sludges, sediments and soils.

By introducing different functional groups on the same SFMM surface, multiple functionality, such as binding to multiple types of species on the same surfaces, is possible. It may also enhance the functionality already on the surface. For instance, introducing –COOH groups in addition to thiol groups on the same SFMM surface increases the SFMM surface binding for cationic species from solutions at neutral pH since the –COOH becomes negatively charged at this pH.

Metals or metal compounds that may be bound include, but are not limited to: As, Bi, Cd, Co, Cu, Pb, Hg, Ni, Pt, Ru, Rh, Ag and combinations thereof.

The SFMM may have any form including powder, fiber, film, membrane, etc. and combinations thereof. The powder may be hollow spheres with mesopores through the wall of the sphere (e.g. wiffle ball).

Target loading and reaction or release rate may be varied by varying process and structural parameters of (a) pore size and shape, wall thickness and surface area of the mesoporous materials; (b) oxide nature (e.g. Si, Zr, or Ti) of the mesoporous materials; (c) surface coverage of the monolayer; (d) the length of a carbon backbone that holds the interfacial functionality; (e) physical forms of the mesoporous materials, e.g. powder, film, or fiber; and (f) the type and thickness of any environmentally sensitive coatings applied to the SFMM. The target-laden material is regenerable by acid and by light, for example mercury-excited light.

Chemical stability of the target-laden SFMM is maximized by using stable and durable inorganic matrix materials (e.g., $SiO_2$, $TiO_2$, $ZrO_2$, etc.) with small pore size for excluding bacteria and by providing strong covalent interfacial bondings of targets. Chemical stability is defined as resistance to change under variations in temperature, solution pH, redox condition, duration, and concentrations of other inorganic and organic ions, and effects of microorganisms.

Preferred materials include but are not limited to silica, titania, and zirconia for making mesoporous material.

Preferred organic functional molecules include but are not limited to silane, for example chlorosilane, alkoxysilane and combinations thereof. For the chlorosilanes, addition to the hydrated mesoporous material should be done carefully as the addition may be exothermic, releasing potentially copious amounts of hydrogen chloride. For chlorosilanes, mixtures of chlorosilane with hydrated mesoporous material is stirred at room temperature overnight to insure complete derivatization of the silica surface (although the reaction most likely is completed within an hour). For alkoxysilanes, the mixture was stirred at room temperature overnight to allow percolation of the alkoxysilane throughout the mesoporous matrix, then heated to reflux for 4 hours (to drive the hydrolysis and condensation chemistry of the alkoxysilane within a reasonable time frame).

Preferred organometallic functional molecules include but are not limited to metallocenes, metal carbonyls, metal alkyls, metal aryls, metal/ligand complexes, and combinations thereof. The organometallic intermediates can serve as useful synthetic intermediates and valuable catalytic precursors. For example, a vinyl-terminated monolayer has been treated with zirconocene hydride chloride to afford the alkyl zirconocene intermediate, which was subsequently cleaved with phosphorous oxychloride to ultimately afford the corresponding phosphonic acid.

Preferred inorganic functional molecules include but are not limited to metal salts, metal alkoxides and combinations thereof. When referring to inorganic functional molecules, it is part of the present invention to include ionic species within the term "functional molecule(s)".

Preferred organic functional molecules are complexing organics, including but not limited to mercaptan, mercaptan-related compounds, amines, methyl, halogen, nitrile, pyridines, alkyls, polymers, and combinations thereof. Most preferred is tris(methoxy)mercaptopropylsilane (TMMPS) because the thiol groups are functional groups having a high affinity for binding metals. With a surface area of greater than or equal to 900 m$^2$/g, a uniform pore size, a high density of functional molecules with a strong affinity for mercury, capacities of up to about 2.0 g mercury per gram of SFMM can be achieved.

It has been discovered that increased surface coverage of the functional molecules on the mesoporous material is obtained by first hydrating or silanolizing the mesoporous material. Hydrating may be accomplished in a number of ways: either by solution hydration or by direct hydration. Solution hydration achieves a hydration of one or more monolayers of water on mesoporous material surfaces by the interaction of water with a solvent. The monolayer amount of water is based upon the available surface area. One solution hydration method has the steps of wetting, preferably by boiling or reflux the mesoporous material in water, to obtain water having a monolayer amount and an excess amount, followed by a step of removing the excess amount and leaving the monolayer amount of at most about 5 monolayers of water, preferably 4 or less monolayers of water and most preferably 1 or 2 monolayers of water molecules on the surfaces of the mesoporous material especially including internal surfaces of pores. Water removal may be by evaporation, or azeotropic distillation. Evaporation may be preferred in a large scale (commercial) production method whereas azeotropic distillation is more convenient for small scale (laboratory) production. The boiling is preferably done at a predetermined temperature of about 100° C. for a predetermined time of about 4 hours.

The removing step by azeotropic distillation is preferably achieved with a distillation solvent selected from the group consisting of benzene, toluene, chloroform and combinations thereof. The azeotropic distillation is done with either a Dean-Stark trap or a standard distillation apparatus. The azeotropic distillation preferably leaves four or less monolayer(s) of water.

Another solution hydration method has the steps of suspending the calcined mesoporous silica in a distillation solvent then adding a monolayer amount of water that would result in creating from one to five monolayers of water molecules on the mesoporous silica surfaces. The mixture is stirred to disaggregate the silica and to ensure complete and uniform distribution of the water.

Alternatively, hydrating may be substantially in the absence of a solvent. Water in an amount to provide one or more (up to about 5) monolayers is added to substantially dry mesoporous material in a closed pressure vessel that is heated, thereby distributing the water over the mesoporous surfaces via the water vapor phase. This solventless hydration is preferred for commercial large-scale production.

The placement of water monolayer(s) on the available surface may then be followed with additional steps resulting in attaching a first plurality of functional molecules containing specific functional groups on the available surface of the mesoporous material. In the alternative approach where hydration is not done, the surface coverage is reduced. Suitable functional molecule precursors are then applied to permeate the hydrated pores and the functional molecule precursors then undergo condensation to form a monolayer or multilayers of functional molecules on the available surface. Permeation of the functional molecule precursors may be by direct mixing, possibly under pressure, of the functional molecule precursors with the mesoporous material, or by solution infusion with a non-aqueous solvent. The solventless direct mixing is preferred for large scale (commercial) production to avoid the need for handling the solvent, whereas for small scale (laboratory) production, the solution infusion is more convenient.

The method of attaching a first plurality of functional molecules containing specific functional groups on the available surface of a of a mesoporous material (hydrated or not hydrated), has the steps of:

(a) mixing the mesoporous material with the first plurality of functional molecule precursor molecules;

(b) stirring for a predetermined time permitting permeation of the functional molecule precursors throughout the pores; and (c) forming a surface functionalized mesoporous material.

When a solvent is used for permeation, the following additional steps are included:

(d) washing the surface functionalized mesoporous material to remove any by-products of the functionalization and removing remaining solvent; and drying the washed material.

Washing is preferably done with a non-aqueous solvent, for example chloroform, of 2- propanol, and drying may be done open or under vacuum.

Reflux is the state of boiling continuously, with the evolved vapor phase being condensed and flowing back into the original mixture. The immersing may be for a time of from about several minutes to about 24 hours. Longer times are preferred for greater surface coverage of the substrate with the functional molecule precursors. For reflux, the predetermined temperature is about 100° C. at atmospheric pressure, and the predetermined time is about 4 hours.

Step (c), forming the surface functionalized mesoporous material, may occur at ambient temperature for a predetermined period (several days) or as a result of heating the mixture at reflux for a predetermined heating period (several hours).

The amount of a functional molecule precursors affects the surface coverage of the functional molecules as a monolayer or multilayer on the mesoporous material. For increased or maximum surface coverage, the relative amount of solvent with respect to functional molecule precursor is reduced. In addition, because of side reactions of the functional molecule precursor, fresh functional molecule precursor may be added at least once with additional reflux to achieve substantially 100% surface coverage.

When a substrate is properly wetted with water, all of the hydrolysis and condensation processes necessary for monolayer formation can still take place, regardless of the relative lack of surface silanols. This is because the surface water induces organosilane hydrolysis on and the resulting hydroxysilane is capable of undergoing condensation with either the siloxane bridges or the silanols of the silica surface. Thus, with the proper amount of water present, approximately $5 \times 10^{18}$ organosilanes can be installed per square meter, in spite of the presence of only $5 \times 10^{17}$ silanols per square meter. Due to the presence of sufficient water, secondary hydrolysis and condensation are facile, and as a result, monolayers prepared by this method are both complete ($5 \times 10^{18}$ silanes per square meter) and robust.

The SFMM may be use alone or in combination with other methods for extracting target metal(s) or metal compound(s), for example in combination with $KI/I_2$ leaching. Metal in contaminated soils and sediments may exist in the form of a sulfide, oxide, elemental metal, halide, phosphate or combination thereof. The metal may exist as solid solution phases and as adsorbed phase with clay minerals, aluminum and iron oxides and hydroxides, and organic matter. Of particular interest are mercuric sulfide, mercuric oxide, elemental mercury, mercury halides, mercuric phosphates and combinations thereof. The SFMM has a much higher mercury-binding capacity than normal ion-exchange materials and other materials because of its greater specific surface area.

Utilization of a small amount of iodine in a KI (or NaOCl/NaCl) leaching solution accelerates the solubilization process through oxidation of sulfides and elemental metal forms. The solubilized metal, especially mercury, then forms strong soluble complexes with halides, which are then adsorbed onto the SFMM. This process is called SFMM Assisted Dynamic Leaching Process (SADLP).

Specifically for mercury, depending on what kind of mercury is present, the mobilization from contaminated soils by $I_2/KI$ solutions and recovery by SFMM are expected through the following reactions:

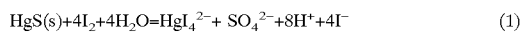

$$HgS(s)+4I_2+4H_2O=HgI_4^{2-}+ SO_4^{2-}+8H^++4I^- \quad (1)$$

$$Hg(l)+I_2+2I^-=HgI_4^{2-} \quad (2)$$

$$HgO (s)+4I^-+2H^+=HgI_4^{2-}+H_2O \quad (3)$$

$$Hg-X_2+2\ K^++4I^-=2KX+HgI_4^{2-} \quad (4)$$

As soon as mercury is solubilized by the reactions described above, it is adsorbed by SFMM:

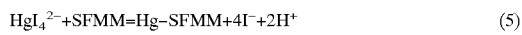

$$HgI_4^{2-}+SFMM=Hg-SFMM+4I^-+2H^+ \quad (5)$$

Until sites on the SFMM are saturated, the mercury concentration in solution is maintained at the ppb level because reaction (5) is extremely fast. This results in constant maximum rates of reactions (1), (2), (3) and (4).

In a large scale separation, a leaching solution of $I_2/KI$ is applied to crushed metal-contaminated debris and soil and mixed to form a slurry. This slurry is agitated by mechanical mixing or air sparging to ensure complete exposure of the solid wastes to the leaching solution. This step will solubilize metal through oxidation (concomitant reduction of iodine) and complexation by iodide ions. The next step is to add SFMM to the slurry of leaching solution and waste solids as plates, large porosity filters, or as granules enclosed in columns that are permeable to solutions. The system is agitated to ensure thorough contact of the leaching solution with the SFMM. The SFMM strongly binds metal and controls the concentration of metal in solution at extremely low levels thus accelerating the leaching reaction of metal from waste solids. Because SFMM is highly specific to metal, especially mercury, with very high binding capacity (up to 2 g mercury/g SFMM), and is also able to bind metal in multiple forms (organic, inorganic, metallic, charged, and neutral species), metal is effectively transferred from waste solids to SFMM in a short period of time. The metal-laden SFMM is then removed from the leaching system and be disposed directly as nonhazardous materials because they not only pass TCLP (usually up to 1000 times lower than the EPA TCLP mercury limit), but also have good long-term durability. The lixiviant solution which is essentially free of metal is then separated and reused. It is important to note that this process is a single-pass process and does not involve multiple applications of the lixiviant solutions, multiple liquid/solid separations, and additional treatment of adsorbed mercury.

Alternatively, the SFMM Assisted Dynamic Leaching Process (SADLP) consists of using NaOCl/NaCl lixiviant (leachant) in an aqueous solution (leaching solution) which is less expensive and less toxic than iodide-based lixiviants. The amount of lixiviant varies according to the concentration of lixiviant in the aqueous solution, contaminant concentration, moisture content, and choice of process whether continuous or batch process. The spent lixiviant (since it is already a metal-free waste) need not be separated from the solid and the slurry mixture and can be directly sent to the next treatment step, e.g., vitrification.

Desorption using a NaCl solution is greatly enhanced by the presence of SFMM during leaching. If metal in contaminated solids is present mainly in adsorbed forms, the use of only NaCl solution as the leachant will reduce the cost and simplify the operation. In this approach, a leaching solution of NaCl (pH 2 to 5) is applied to form slurries with crushed debris and soils. SFMM in the form of porous filters or self-containing columns is added to the mixture of leaching solution and the waste solids and the mixture agitated. A dynamic transfer of metal from soil to solution to the SFMM is established during the entire course of the leaching. The metal-laden SFMM are then removed from the leaching system and be disposed as nonhazardous wastes. The mixture is free of metal and is ready for subsequent treatment if necessary.

SFMM may be applied directly to remove/separate dissolved metal from sludges which contain sufficient liquid to promote metal migration or from soil slurry prepared as a feed for a melter such as the Oak Ridge Transportable Vitrification System (TVS), or from other miscellaneous dry wastes which are slurried with water. The packed SFMM are immersed in sludges or the soil slurry with moderate agitation to facilitate metal diffusion and subsequent adsorption by SFMM. During this process, the concentration of metal in the liquid phase is expected to be lowered into ppb range in a very short time. The SFMM plates, filters, or columns are then removed from the sludge or slurry, and the metal-laden SFMM can then be disposed directly as a nonhazardous material. This method is also applicable to nonaqueous sludges since SFMM is also effective in removing metal from organic wastes. This is a simple and cost-effective method for treating wastes which contain mainly water-leachable forms of metal.

In cases where conventional leaching process is utilized to mobilize metal, the leaching solutions can be regenerated very quickly by passing them through a column of SFMM materials. The metal in the leaching solution is lowered below ppb levels without interference from other abundant common cations such as high concentrations of Na and Ca. The process also eliminates the treatment of the separated metal since metal-laden SFMM can be disposed of directly as nonhazardous solid wastes.

By mixing the proper amount of powder forms of the SFMM with the targeted wastes (e.g. metal-bearing nonliquid sludges, and soils), the metal is stabilized in SFMM whenever the wastes are leached by rain water, or other acidic groundwater (due to enzymatic reactions), or in EPA TCLP test conditions, so that these wastes are practically stabilized to comply with regulations. The mixing equipment can be commercial cementing equipment and the waste volume increase may be negligible (less than 1 volume percent), depending on the total metal contents of the wastes. As mentioned before, the metal-loaded SFMM is more oxidation resistant due to the covalent bonding of the metal and is less susceptible to microorganism intrusion or attack due to the small pore size of the mesoporous substrate.

In-situ stabilization of mercury with SFMM may be effective for large-volume wastes in ponds and ditches. In-situ stabilization involves placing a metal/mercury-collecting screen, sheet, or column made of SFMM throughout the contaminated ponds and ditches or in nonaqueous liquids or partially- or fully-stabilized sludge. Metal/mercury speciations (metallic, inorganic, organic, charged mercury speciations, and neutral compounds such as $HgCl_2$, $Hg[OH]_2$,) are all concentrated and stabilized in the SFMM. The mercury content in the contaminated wastes are reduced to pass the TCLP test and will leach far less than 0.2 mg/l in the TCLP test.

Another in-situ stabilization approach is an engineered barrier for mercury-contaminated wastes wherein SFMM is made as part of the vertical and horizontal barriers. Any mercury released from the wastes is immobilized in the SFMM; these barriers have high mercury capacity and are durable because of the mesoporous substrate structure.

Stabilization of bulk nonrecyclable mercury using SFMM is more cost-effective than the usual mercury-amalgamation process. Although the mercury-loaded SFMM can control mercury solubility to meet Universal Treatment Standards, the Mercury-SFMM also can be easily stabilized into apatites that exist in nature for many of years by simply immersing these materials in an aqueous mixture of phosphoric acids and calcium hydroxides.

The SFMM may be made into wide range of engineered forms such as beads, pellets, filaments, powders, membranes, films, etc. and loaded into columns or other devices for flow- through treatment of liquid streams (aqueous solution and nonaqueous liquids are passed through different columns). They have good mechanical strength and are durable and stable in air and in aqueous solutions and can be used directly as a waste form for contaminant stabilization, especially metal stabilization. The effluents are essentially free of metal and meet EPA standards. The metal-loaded column materials can be disposed directly as stable waste forms without additional treatment. Engineering forms include but are not limited to filters, molecular sieves, and column materials to remove cationic, organic, metallic metal, and even neutral metal compounds from aqueous solutions, sludges, and soils without interference from other cations, such as abundant $Ca^{2+}$ in groundwater. Alternatively, SFMM in the powder form may be flushed as a suspension through pipelines or other hard-to-reach area for removal of a target material.

Offgas filtering may be done with SFMM. The SFMM has a mercury capacity of at least 20 wt % and has a strong affinity for mercury. Mercury vapor can be removed to meet EPA air release standards in the presence of large amounts of water vapor, carbon dioxide gas, and other gases. Gas/air filters made of SFMM may be installed inside waste storage buildings for the elimination of possible mercury vapor accumulation to ensure the safety of building personnel. The SFMM is effective in removing mercury at room temperature.

The examples below demonstrate (1) the method and role of hydrolysis in functionalizing mesoporous materials (Examples 1–3); (2) the functionalization of mesoporous materials for mercury separations (Examples 4–8); (3) the functionalization of mesoporous materials for other metal separations, including radionuclides (Examples 9–11), wherein Example 10 includes the functionalization of mesoporous material with multiple layers (multilayer); (4) the functionalization of mesoporous materials for liquid separations (Example 12), (5) the functionalization of mesoporous material for multifunctionality (Example 13), (6) the functionalization of engineered forms of mesoporous materials (Example 14), and (7) functionalization of mesoporous materials using inorganic and organometallic functional molecules (Example 15).

EXAMPLE 1

An experiment was conducted to demonstrate hydration of mesoporous silica with a monolayer amount of water in a distillation solvent. The silica used in this experiment was in powder form having a particle size ranging from about 5 $\mu$m to about 15 $\mu$m with a pore size of about 5 nm and a surface area of 871 $m^2$/g. Five grams of mesoporous silica were mixed with 100 mL of solvent with 1.6 mL of water. The mixture was stirred at room temperature for one hour. The resulting silica was hydrated with two to four monolayers of water.

EXAMPLE 2

An experiment was conducted to demonstrate the reduced coverage of the functional molecule on the mesoporous surface in the absence of hydration.

An amount of mesoporous silica (1.29 g) (mesoporous material) was mixed with 2.0 mL of functional molecule tris(methoxy)mercaptopropylsilane (TMMPS) in 100 mL chloroform. The mixture was stirred at room temperature for over 5 days and then filtered. Only about 10% of the mesoporous silica surface was covered with a monolayer.

EXAMPLE 3

An experiment was conducted to demonstrate 100% monolayer surface coverage on a mesoporous material. The SFMM was made from a silica powder having a pore size of about 65 Angstroms. An amount of the mesoporous silica (160 g) was suspended in 477 g of reverse osmosis water and heated to reflux for 3 hours to introduce water to the available surface of the mesoporous material silica powder. The water containing mesoporous material silica powder was mixed with 1.5 L of toluene in a flask fitted with a Dean-Stark trap and heated to reflux. The Dean-Stark distillation removed 325 g water leaving approximately 50 g of water on the mesoporous material silica surface of about 2.5 monolayers of water for a hydrated mesoporous silica powder in the benzene. An amount (200 g) of TMMPS was added and stirred overnight at room temperature followed by heating to reflux for 6 hours. After cooling, an additional 50 g of TMMPS was added, stirred overnight and heated a second time to reflux for 6 hours. The refluxed mixture was cooled, filtered and washed with 2-propanol, followed by drying under vacuum, yielding a SFMM product having 100% coverage of a monolayer of functional molecules on the available surface of the mesoporous material.

EXAMPLE 4

An experiment was conducted to demonstrate mercury removal using SFMM. The SFMM was made from a silica powder having a pore size of about 65 Angstroms mixed with mercaptopropylsilane layer in powder form with a 10–25% surface coverage of the mercaptopropylsilane. For the 10% surface coverage, the mesoporous silica (1.29 g) was mixed with 2.0 mL TMMPS in 100 mL chloroform. The mixture was stirred for over 5 days at room temperature then filtered, washed copiously with chloroform and dried under vacuum.

For the 25% surface coverage, the mesoporous silica (4.32 g) was suspended in 125 mL of reverse osmosis water and taken to reflux for 4 hours. After cooling to room temperature, the suspension was centrifuged, water decanted, and the silica air dried for 5 days. This hydrated mesoporous silica was then suspended in 250 mL of toluene, treated with 2.0–30.0 mL of TMMPS and taken to reflux for 4 hours forming the coated powder. After cooling, the coated powder was separated from the liquid and washed and dried.

The SFMM was applied to simulated aqueous waste from DOE's Savannah River Site (SRS) radioactive waste holding Tank L and to simulated nonradioactive vacuum pump oil waste from the SRS Tritium Facilities. The initial metal concentrations in the simulated waste are shown in Table 4-1. Kd is the ratio of A/C where A is the amount of metal (mercury) bound by the SFMM in microgram ($\mu$g) of metal (mercury) per gram of SFMM, and C is the concentration of metal (mercury) remaining in solution in microgram ($\mu$g) per milliliter (ml).

TABLE 4-1

Initial Metals Concentrations (ppm) in Simulated Waste

| Waste | Mercury | Ag | Cr | Pb | Ba | Zn | Na |
|---|---|---|---|---|---|---|---|
| PH 3 | 6.20 | 1.80 | 1.79 | 7.22 | 7.18 | 3.96 | 2220 |
| PH 7 | 6.00 | 0.45 | 1.13 | 5.25 | 7.12 | 2.75 | 2212 |
| PH 9 | 6.35 | 1.04 | 058 | 2.90 | 715 | 1.32 | 2222 |
| Oil | 12.10 | | | | | | |

The experiments included mixing the SFMM powders with the simulated wastes (at volume/mass ratios of waste to SFMM ranging from 20 to 100 ml/mg) at room temperature for 2 hours. The results in Table 4-2 (10% SFMM) and Table 4-3 (25% SFMM) showed that SFMM reduced all metal concentrations including mercury concentration in simulant wastes from 6.35 ppm to 0.7 ppb (below the drinking water limit of 2 ppb) by just a single treatment. The Kd for the adsorption reaction was calculated to be as large as 340,000 within the range of pH from 3 to 9, despite the presence of large concentrations of other cations (e.g., 2220 ppm Na) in the waste.

The SFMM reduced the mercury level in a waste oil sample equal to 20 times the mass of the SFMM from 12.1 ppm to 0.066 ppm (hazardous waste limit is 0.2 ppm), thus showing that SFMM can also effectively treat nonaqueous wastes.

TABLE 4-2

Post-SFMM Metals Concentrations (ppm) and Kd of Mercury For Treatment with 10% coverage SFMM

| Waste | Hg | Ag | Cr | Pb | Ba | Zn | Na | $Kd_{Hg}$ |
|---|---|---|---|---|---|---|---|---|
| PH 3 | 0.011 | <.005 | 1.45 | 1.66 | 7.60 | 3.93 | 2236 | 55670 |
| PH 7 | 0.006 | <.005 | 0.70 | 0 | 7.35 | 2.23 | 2202 | 90974 |
| PH 9 | 0.006 | <.005 | 0.71 | 0 | 7.40 | 1.41 | 2218 | $1*10^5$ |
| Oil | 0.635 | | | | | | | 1806 |

TABLE 4-3

Post-SFMM Metals Concentrations (ppm) and Kd of Mercury For Treatment with 25% coverage SFMM

| Waste | Hg | Ag | Cr | Pb | Ba | Zn | Na | $Kd_{Hg}$ |
|---|---|---|---|---|---|---|---|---|
| PH 3 | 0.001 | <.005 | 1.67 | 2.26 | 8.64 | 5.06 | 2185 | $3*10^5$ |
| PH 7 | 0.001 | <.005 | 0.07 | 0 | 8.21 | 1.54 | 2114 | $3*10^5$ |
| PH 9 | 0.001 | <.005 | 0 | 0 | 8.82 | 1.19 | 2201 | $3*10^5$ |
| Oil | 0.06 | | | | | | | 3467 |

EXAMPLE 5

An experiment was conducted to demonstrate surface coverage of a substrate (silica) with functional molecules (organic molecules TMMPS).

Figure 3A:
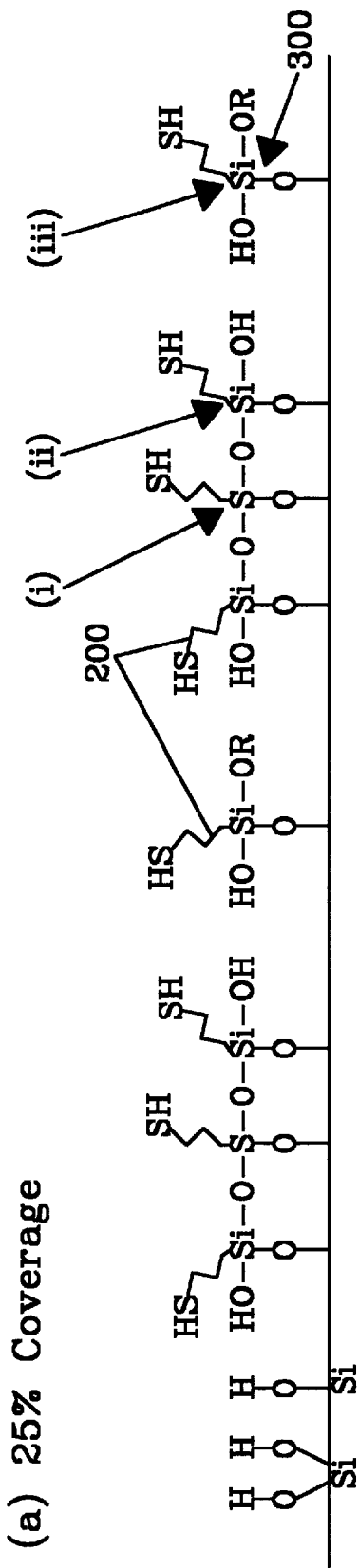
FIG. 3a is a diagram of 25% monolayer coverage.
Figure 3B:
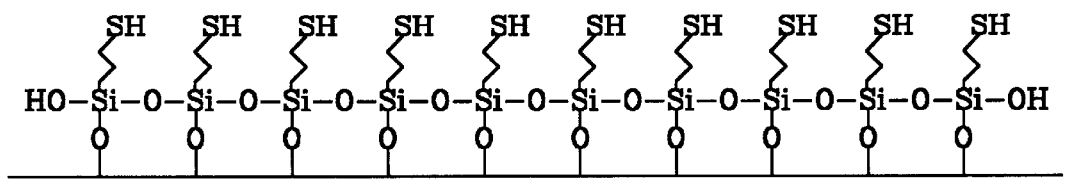
FIG. 3b is a diagram of 76% monolayer coverage.
Figure 3C:
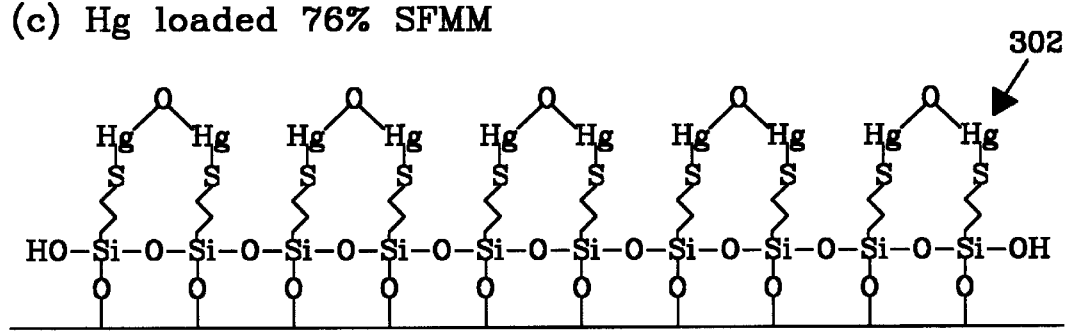
FIG. 3c is a diagram of 76% monolayer coverage with mercury loading.
Figure 4:
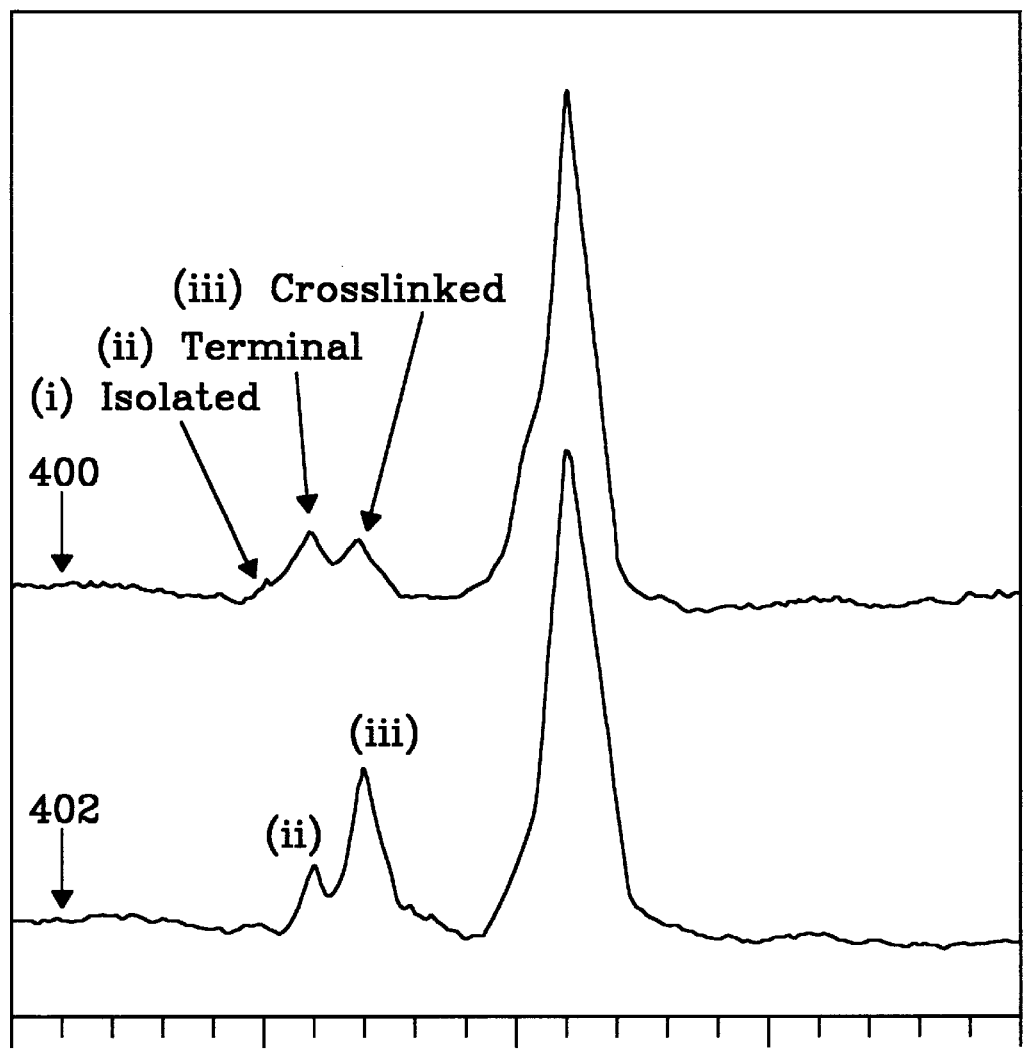
FIG. 4 is a NMR spectra of SFMM.
Figure 5:
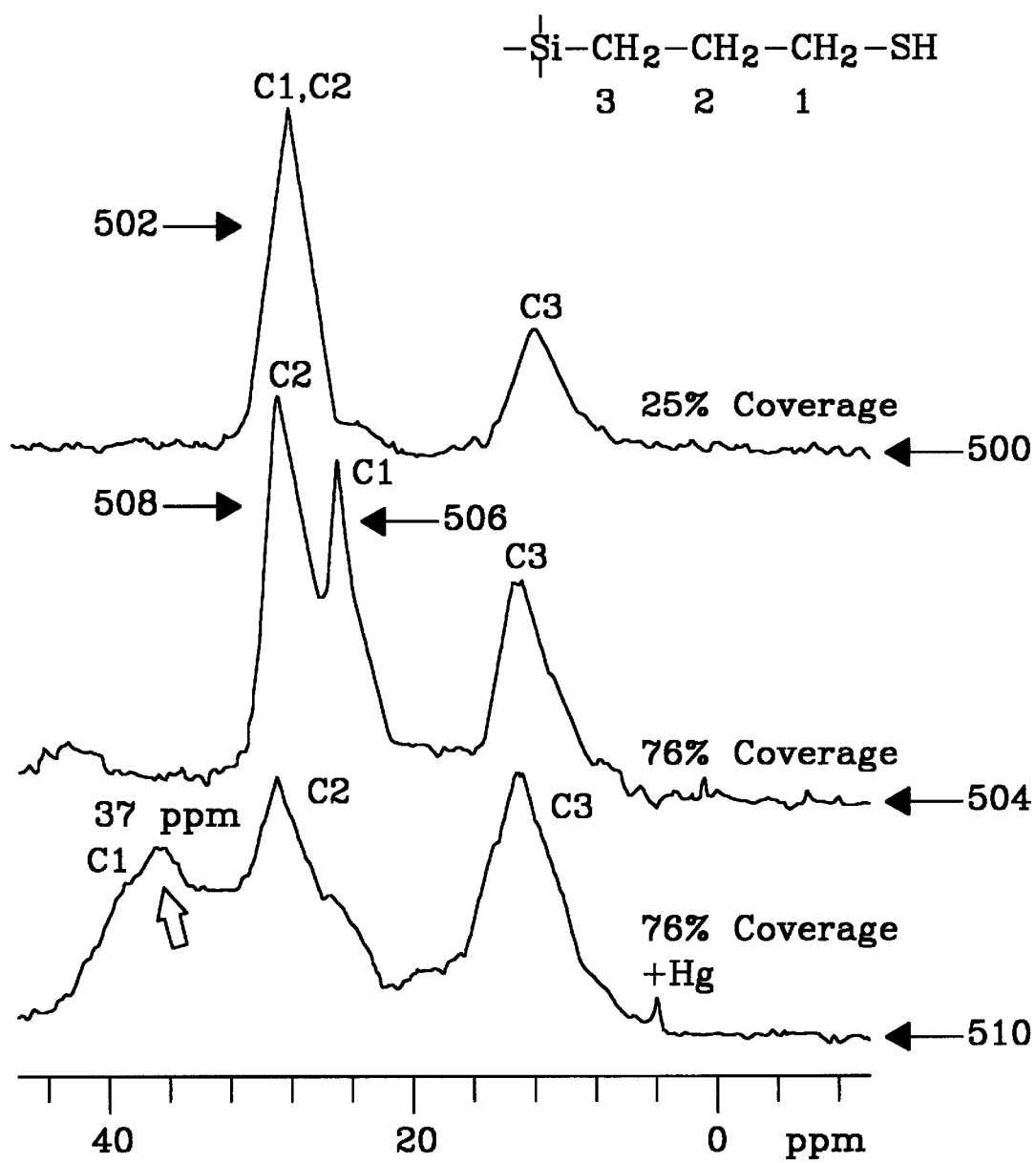
FIG. 5 is a $^{13}C$ spectra of SFMM.

FIG. 3a shows low (25% of total possible organic molecule coverage) coverage of the organic molecules 200 and three different environments for the siloxane groups 300, (i) isolated, (ii) terminal and (iii) cross-linked. FIG. 3b shows higher coverage (76%) of the organic molecules. FIG. 3c shows SFMM after exposure to mercury 302. This is supported by NMR spectra in FIG. 4. The spectra for 25% coverage 400 shows three peaks (i), (ii), and (iii) corresponding to isolated, terminal and cross-linked conformations, whereas the spectra for 76% coverage 402 does not have the peak i for the isolated conformation. Further evidence of distinguishing low (25%) coverage from high (76%) coverage is given in FIG. 5. Spectra from $^-$C for 25% coverage 500 shows no distinction between C1 and C2 in peak 502 because of conformational heterogenaety, whereas the spectra for 76% coverage 504 has two distinct peaks 506, 508 for C1 and C2 because of greater homogenaety. Upon binding to mercury, the spectra 510 is broadened and the C1 peak is shifted because of the strong chemical bonding between the mercury and the thiol group. The fact that the C3 peak is still present indicates that the SFMM is not saturated with mercury.

EXAMPLE 6

An experiment was conducted to demonstrate the mercury removal capability of SFMM with 100% surface coverage (from Example 3), compared to a commercially available mercury absorber GT-73 (Duolite$^R$ GT-73 from Rohm and Haas Company of Philadelphia).

Wastewater samples were made in the laboratory with aqueous sodium nitrate (0.1 M) with mercury salt. Samples were made having differing levels of mercury contamination. One sample had an initial mercury concentration of 487 ppb and a second sample had an initial mercury concentration of 9740 ppb. Each wastewater sample was divided into two parts and each part separately mixed with SFMM (100% surface coverage) and GT-73. The wastewater sample parts mixed with SFMM were in a wastewater to SFMM ratio of 2083 ml/g, and the wastewater sample parts mixed with GT-73 were in a wastewater to GT-73 ratio of 2083 ml/g.

Figure 6A:
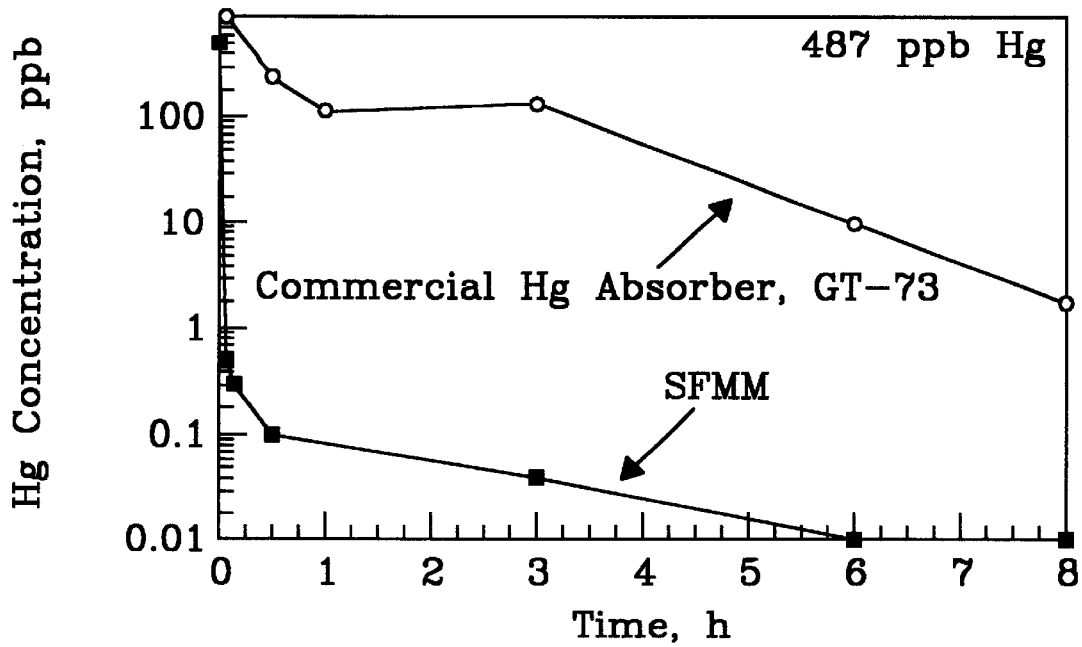
FIG. 6a is a graph of mercury concentration versus time for SFMM and a GT-73 commercial mercury absorber for a starting mercury concentration of 487 ppb.
Figure 6B:
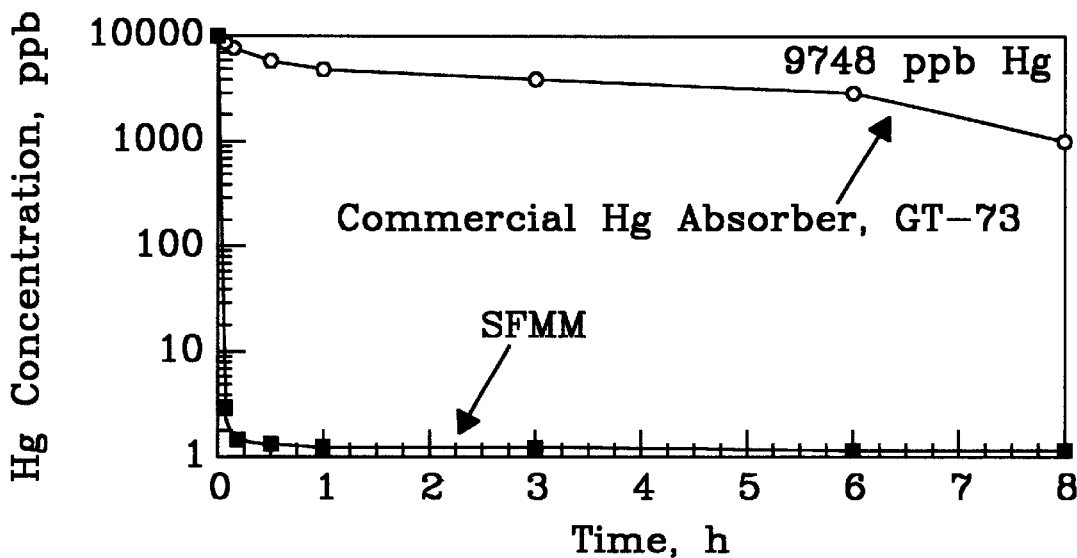
FIG. 6b is a graph of mercury concentration versus time for SFMM and a GT_73 commercial mercury absorber for a starting mercury concentration of 9748 ppb.

Results are shown in FIG. 6a and FIG. 6b. In FIG. 6a, the 487 ppb mercury solution mixed with SFMM was reduced to 0.01 ppb within 6 hours whereas the commercial mercury absorber (GT-73) reduced the 487 ppb mercury concentration to only 2 ppb within 8 hours as shown. The Kd (defined in Example 4) value calculated for SFMM was $1.0 \times 10^8$. The mercury loading calculated is about 0.64 g mercury per gram of SFMM.

The SFMM materials reduced the 9740 ppb mercury solution to 1.2 ppb within one hour while the commercial mercury absorber, reduced the mercury concentration to only 1.01 ppm within 8 hours as shown in FIG. 6b.

EXAMPLE 7

An experiment was mesoporous materials with a monolayer of functional molecules of tris(methoxy)mercaptopropylsilane (TMMPS) at surface coverage from 20 to 100%.

Systematic variation of surface coverage is obtained by using the hydration procedure of the present invention, followed by treating the wetted silica with the amount of silane corresponding to the desired surface coverage, based on the amount of available surface area. Substantially quantitative incorporation of silane was observed with this protocol.

Figure 7:
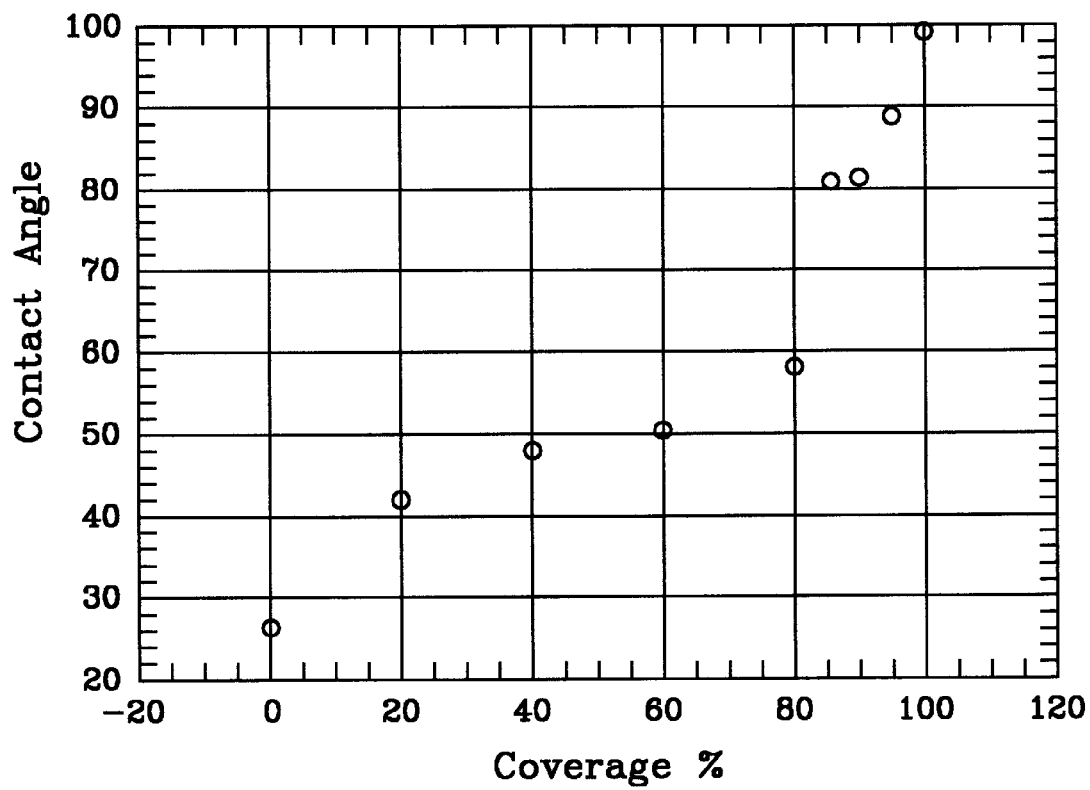
FIG. 7 is a graph of wetting contact angle as a function of SFMM surface coverage.

The data in Table 7-1 shows that a silica-based mesoporous material with a thiol (-SH) functional group can be installed at surface coverage of 20, 40, 60, 80, 85, 90, 95, and 100%. A hydrolyzed silica mesoporous material with 0% HS-functional group is hydrophilic. The hydrophobicity of a surface was characterized by measuring the wetting contact angle of a water drop on the surface of this material. A static contact angle measurement of a hydrolyzed glass surface showed a low contact angle around 27, i.e., the surface was hydrophilic. When the surface of the SFMM was covered with 20% HS- group, the surface became less hydrophilic, or more hydrophobic, which was characterized by an increase in contact angles to about 42. The higher the surface coverage by HS-group of SFMM material the higher the measured contact angle is. The measured contact angles on SFMM were also plotted as a function of surface coverage of HS-group as shown in FIG. 7 showing that the contact angle increases are a nonlinear function of surface coverage. The increase in contact angle is smaller before surface coverage of 80% and the increases are much larger after 80% surface coverage with HS-group.

TABLE 7-1

Effect of SFMM Surface Coverage on Wetting Contact Angle and Loading

| Coverage (%) | Contact angle (degrees) | STD DEV. | LOADING (mg/g) |
|---|---|---|---|
| 0 | 26.8 | * | 0 |
| 20 | 42.1 | 2.2 | 345 |
| 40 | 47.7 | 3.9 | 553 |
| 60 | 51 | 3.8 | 630 |
| 80 | 57.7 | 1.9 | 703 |
| 85 | 81.5 | 3 | 643 |
| 90 | 81.8 | 0.2 | 726 |

TABLE 7-1-continued

Effect of SFMM Surface Coverage on Wetting Contact Angle and Loading

| Coverage (%) | Contact angle (degrees) | STD DEV. | LOADING (mg/g) |
|---|---|---|---|
| 95 | 88.8 | 3.8 | 604 |
| 100 | 99 | 1.2 | 610 |

Figure 8:
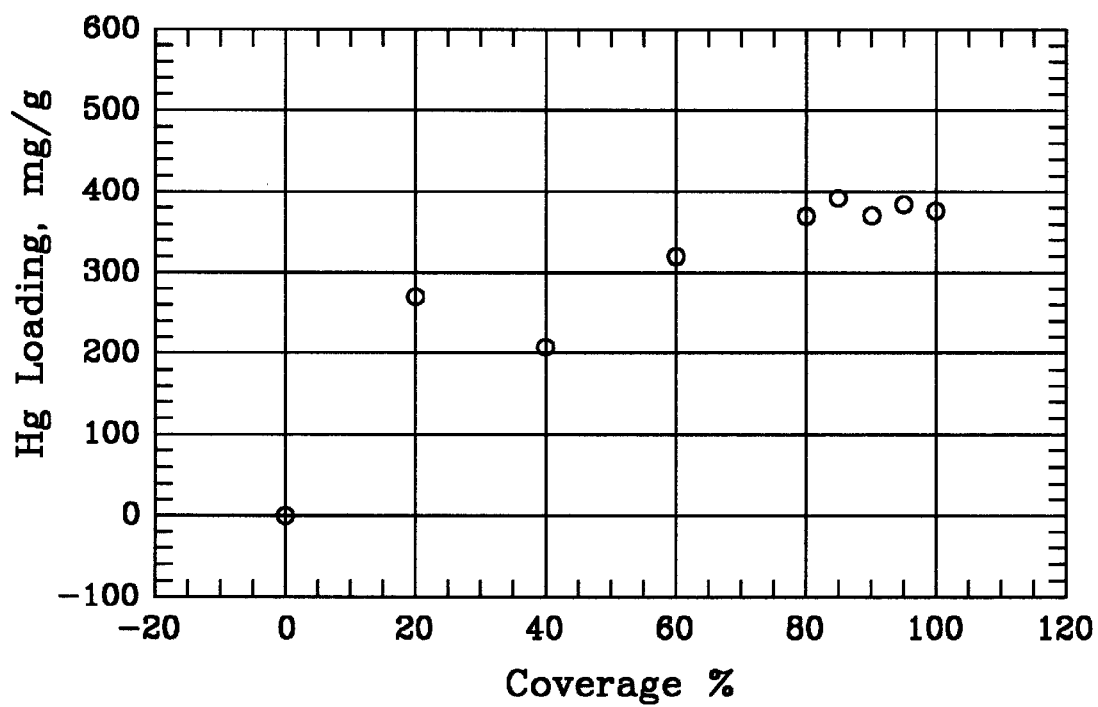
FIG. 8 is a graph of mercury loading as a function of SFMM surface coverage.

Test condition: room temperature; solvent: water; sample preparation: SFMM powder (0.25 g) was compressed into a disc with a pressure of 22.9 kg/cm2 for 0.5 minute.
* The 0% surface coverage was the measurement of a piece of glass plate FIG. 8 shows the mercury loading of SFMM with different coverage, indicating that the mercury loading increases with surface coverages of HS-groups up to 80%. The mercury loading tends to decrease for surface coverage between 80 to 100% coverage of HS-groups because the hydrophobicity of the surface increases to a point that the mercury ions have greater difficulty contacting the thoil groups. This finding is important for the manufacture and application of HS-SFMM since we can chose the SFMM with 80% coverage as the optimized material for aqueous at 80% surface coverage:

1) we use less tris(methoxy)mercaptopropylsilane to manufacture the SFMM, leading to reduced manufacturing costs;
2) HS-SFMM has a low hydrophobicity (a low static contact angle) so SFMM can be applied easily in aqueous systems;
3) HS-SFMM has the highest achievable mercury loading.

Similar optimization can be achieved for application in organic solvents and for SFMM with different functional groups and for different metals, the optimized surface coverage may be different than the 80% coverage shown in FIGS. 7 and 8.

EXAMPLE 8

An experiment was conducted to demonstrate the removal of mercury from non-aqueous liquids. Actual tritiated vacuum pump oil wastes generated in the SRS Tritium Facilities were tested at Oak Ridge National Laboratory using the SFMM powders made according to Example 3. Samples (3 mL) of SRS tritiated vacuum pump oil wastes were mixed with 0.01 to 0.3 g of SFMM, and the mixtures were equilibrated for 48 hours before they were filtered and analyzed for mercury. All the tests were performed in duplicate.

Another two sorbents, sulfur (commercially available) and sulfur-impregnated activated carbon (SIAC) (Nucon International, Inc.), were tested under similar conditions for comparison.

Control tests without sorbent were also tested with two different SRS pump oils, wherein no SFMM material was used. The oils were equilibrated for 48 hour and filtered then analyzed for mercury content. Hence some of the mercury was taken out of solution by the filter. This was accounted for in the analysis of the mercury loading of the SFMM.

Figure 9:
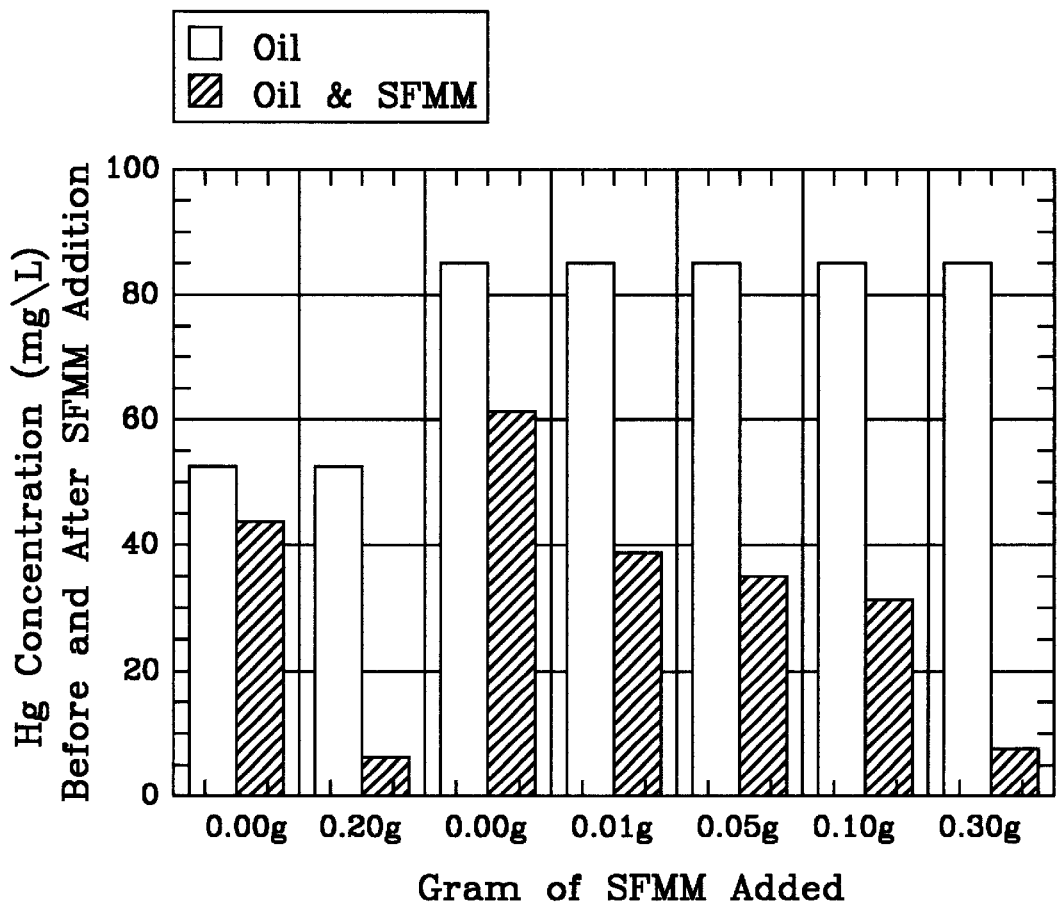
FIG. 9 is a bar chart showing initial mercury concentration in oil (white bar) and the final mercury concentration after SFMM addition (black bar).

The results in Table 8-1 and FIG. 9 show that SFMM was able to remove up to 91% of the mercury in the tritiated pump oils through the single treatment. The removing efficiencies for sulfur and sulfur-impregnated activated carbon were 28 and 9% respectively. The Kd for SFMM in the actual tritiated pump oil was up to $3.47 \times 10^5$, and the observed mercury loading was up to 13.59 mg/g.

TABLE 8-1

Mercury Removal From Actual SRS Tritiated Pump Oils

| Sorbent | Sorbent G | Initial mg/Kg | Final mg/Kg | Kd | Loading mg/g | Decrease % |
|---|---|---|---|---|---|---|
| Control-1 | 0 | 52.1 | 43.5 | | | |
| SFMM | 0.2 | 52.1 | 6 | 1.16E + 05 | 0.69 | 89 |
| Sulfur | 0.2 | 52.1 | 37.3 | 5.95E + 03 | 0.22 | 28 |
| SIAC | 0.2 | 52.1 | 47.3 | 1.52E + 03 | 0.07 | 9 |
| Control-2 | 0 | 84.5 | 61.4 | | | |
| SFMM | 0.01 | 84.5 | 39.2 | 3.47E + 05 | 13.59 | 54 |
| SFMM | 0.05 | 84.5 | 34.8 | 8.57E + 04 | 2.98 | 59 |
| SFMM | 0.1 | 84.5 | 33 | 4.68E + 04 | 1.55 | 61 |
| SFMM | 0.3 | 84.5 | 7.6 | 1.01E + 05 | 0.77 | 91 |

EXAMPLE 9

Experiments were conducted as in Example 4 to demonstrate the separation of metals other than mercury. The functional group for binding the metals was thiol (HS). The data in Table 9-1 also showed that it has strong binding to Cu, Cd, Ag, Pb, and Eu, almost no binding to Ca, Co, and Mg, and weak binding to Zn.

TABLE 9-1

HS-SFMM's Binding of Other Metals in 0.1 M NaNO3 Solution

| Metal | Sample ID | Initial Conc. (mg/L) | Final Conc (mg/L) | Kd |
|---|---|---|---|---|
| Ag (+1) | C3S-AG-31 | 0.09 | 0.01 | 8900 |
| Ca (+2) | C3S-CA-31 | 2.07 | 2.07 | 0 |
| Cd (+2) | C3S-CD-31 | 0.03 | 4.67 | 14467 |
| Co (+2) | C3S-CO-31 | 2.81 | 2.67 | 5 |
| Cr (+3) | C3S-CR-72 | 2.63 | 0.02 | 700 |
| Eu (+3) | C3S-EU-31 | 9.01 | 1.22 | 639 |
| Cu (+2) | C3S-CU-32 | 2.24 | 0.01 | >44700 |
| Pb (+2) | C3S-PB-71 | 3.04 | 0.03 | 913 |
| Mg (+2) | C3S-MG-31 | 1.58 | 1.58 | 0 |
| Mg (+2) | C3S-MG-32 | 1.58 | 1.56 | 1 |
| Zn (+2) | C3S-ZN-71 | 2.79 | 2.41 | 16 |

EXAMPLE 10

An experiment was conducted to demonstrate attachment of different functional groups, specifically EDA, DETA and $C_3CN$ on the TMMPS functional molecule of the SFMM to achieve different selectivity. In addition, multilayer functionalization was demonstrated.

a) Ethylenediamine (EDA)-SFMM

It showed strong binding to Ni(+2), Zn(+2), and Co(+2) as shown in Table 10-1.

TABLE 10-1

EDA-SFMM for Ni, Co, and Zn in 0.1 M NaNO3

| Meta | Initial Conc. (ppm) | Final Conc. (ppm) | Kd |
|---|---|---|---|
| Ni | 2.73 | 0.02 | 16963 |
| Co | 2.71 | 0.22 | 1132 |
| Zn | 2.91 | 0.10 | 2869 | b) Diethylenetriamine (DETA)-SFMM

It showed strong binding to Cr(+3), and Eu(+3) as shown in Table 10-2.

TABLE 10-2

DETA-SFMM for Cr and Eu in 0.1 m NaNO3

| Meta | Initial Conc. (ppm) | Final Conc. (ppm) | Kd |
|---|---|---|---|
| Cr | 2.39 | 0.19 | 1171 |
| Eu | 0.79 | 0.01 | 5543 |

Transition metals form complexes with the EDA and DETA functional molecules. These transition metal polyamine complexes are highly charged and can be used as ion exchange materials, sorbent materials, catalysts, etc.

c) Cyanopropyl-(C3CN)-SFMM

It has not shown any better binding for metals than HS-SFMM, EDA-SFMM, and DETA-SFMM.

d) HOPO-SFMM

An experiment was conducted to demonstrate the propylmercaptan monolayer of functional molecules together with multilayers made from a layer of amino propyl silane and functionalized with the 1,2-hydroxypyridinone (1,2-HOPO), 3,4-hydroxypyridinone (3,4-HOPO). The HOPO ligands were developed by professor K. N. Raymond's group at University of California, Berkeley (Department of Chemistry, Berkeley, Calif. 94720-1460). Am(III), Th(IV), Np(V), and U(VI) were selected as the models for tri-, tetra-, penta- and hexa-valent actinides, respectively. $NaNO_3$ was added to give a 0.1M of $Na^+$ concentration to ensure a rigorous test of selectivity. The solutions were adjusted to different pH's with final equilibrium pHs ranging from 0.88 to 6.8. The tests were performed in batch mode using SFMM powders. Liquid scintillation counting was used to measure $^{241}Am$ and $^{237}Np$ and inductively coupled plasma-mass spectrometry was used to analyze $^{238}U$ and $^{232}Th$.

Preliminary data indicate that 1,2-HOPO-SFMM are very effective in removing trivalent actinides with Kd in the range of $1.9 \times 10^5$ to $4.5 \times 10^5$. At pH 6.80, SFMM reduced 241Am concentration in solutions from 7.1 ppb to 4 ppt and radioactivity from 53,500 cpm/mL to 30 cpm/mL. Mercaptan SFMM and 1,2-HOPO-SAMMS are both effective in removing tetravalent actinides with Kd in the range of $1.6 \times 10^2$ to $8.4 \times 10^2$. Only 1,2-HOPO-SFMM is effective in removing penta- and hexa-valent actinides with Kd in the range of $1.8 \times 10^2$ to $3.6 \times 10^2$. The 3,4-HOPO-SFMM did not show significant binding with actinides under the acidic to neutral conditions tested. The reported Kd values for these actinides using commercial ion exchange materials under similar test conditions are usually less than 100 (S. F. Marsh, Z. V. Svitra, S. M. Bowen, Los Alamos National Laboratory Report LA-12654, October 1993, Los Alamos, N. Mex.). HOPO-SFMM also decreased chromate concentration in 0.1 M sodium nitrate from 10.1 ppm to 0.07 ppm with a Kd as high as 28,657.

e) SFMM with propyl-N,N,N,-Tri-n-Butylammonium.

TABLE 10-3

A: $ReO_4^-$ in 0.1 m NaNO3 solution at pH 6.0

| Initial Re Conc. (ppm) | Final Re Conc. (ppm) | $V_{waste}/W_{SFMM}$ | Kd |
|---|---|---|---|
| 31.2 | 21.4 | 50 | 23 |
| 31.2 | 29.0 | 200 | 15 |
| 31.2 | 0.61 | 10 | 61 |

TABLE 10-4

B: $H_2AsO_4^-$ in 0.1 m NaNO3 at pH 6.0

| Initial As Conc. (ppm) | Final As Conc. (ppm) | $V_{waste}/W_{SFMM}$ | Kd |
|---|---|---|---|
| 6.5 | 0.24 | 50 | 1304 |

TABLE 10-5

C: $H_2AsO_4^-$ in 0.05 m NaHCO3 at pH 6.0

| Initial As Conc. (ppm) | Final As Conc. (ppm) | $V_{waste}/W_{SFMM}$ | Kd |
|---|---|---|---|
| 4.8 | 0.15 | 50 | 1550 |

TABLE 10-6

D: $CrO_4^{2-}$ in 0.1 m NaNO3 at pH 6.0

| Initial Cr Conc. (ppm) | Final Cr Conc. (ppm) | $V_{waste}/W_{SFMM}$ | Kd |
|---|---|---|---|
| 100 | 95 | 50 | 2.6 |
| 100 | 98 | 200 | 1.0 |
| 10 | 6.2 | 10 | 6.1 | f) SFMMM with —CH2—CH2—CH2—N(CH3)2($C_{18}H_{37}$)$^+$Cl$^-$

TABLE 10-7

A: $ReO_4^-$ in 0.1 m NaNO3 solution at pH 6.0

| Initial Re Conc. (ppm) | Final Re Conc. (ppm) | $V_{waste}/W_{SFMM}$ | Kd |
|---|---|---|---|
| 33 | 7.7 | 50 | 164 |
| 33 | 14 | 100 | 136 |

TABLE 10-8

B: $H_2AsO_4^-$ in 0.1 m NaNO3 at pH 6.0

| Initial As Conc. (ppm) | Final As Conc. (ppm) | $V_{waste}/W_{SFMM}$ | Kd |
|---|---|---|---|
| 5.1 | 4.56 | 50 | 6 |
| 5.1 | 4.57 | 100 | 12 |

TABLE 10-9

C: $CrO_4^{2-}$ in 0.1 m NaNO3 at pH 6.0

| Initial Cr Conc. (ppm) | Final Cr. Conc. (ppm) | $V_{waste}/W_{SFMM}$ | Kd |
|---|---|---|---|
| 110 | 62.5 | 50 | 38 |
| 110 | 78.1 | 100 | 41 |

EXAMPLE 11

An experiment was conducted to demonstrate radionuclide removal from water supernate from high-level waste tank 102-SY on the Hanford site near Richland, Wash..

The SFMM was made from a silica powder having a pore size of about 65 Angstroms received a mercaptanpropylsilane (TMMPS) layer as an SFMM powder with a 76% surface coverage of the mercaptanpropylsilane. The mesoporous silica powder (3.5 g) was suspended in 100 mL reverse osmosis water and heated to reflux for 3 hours to wet the mesoporous silica powder. The wetted mesoporous silica powder was mixed with 250 mL benzene in a flask fitted with a Dean-Stark trap and heated to reflux. The Dean-Stark distillation removed 4.5 mL water leaving approximately 2.0 mL of water on the silica surface of about 4 monolayers of water for a hydrated mesoporous silica powder in the benzene. An amount (20 mL) of TMMPS was added and stirred overnight at room temperature followed by heating to reflux for 4 hours. The refluxed mixture was cooled, filtered and washed with 2-propanol, followed by drying under vacuum, yielding 6.2 g of SFMM powder.

The supernate was mixed with the SFMM powder and stirred for about 1 hour. The radionuclides, the ratio of supernate volume to SFMM weight and pH of supernate is shown in Table 11-1.

TABLE 11-1

Radionuclides Test Parameters

| Radionuclide | (Vol. Supernate)/(wt. SFMM) (ml/g) | pH |
|---|---|---|
| Am (III) | 156 | 3 |
| Pu (IV) | 50 | 1 |
| $NpO_2$ (V) | 50 | 4 |
| Pu (VI) | 50 | 3 |

Results of the mixing are shown in Table 11-2 and compared to S. F. Marsh, Z. V. Svitra, S. M. Bowen, "Distributions of 14 Elements on 60 Selected Absorbers from Two Simulated Solutions for Hanford HLW Tank 102-SY," LA-12654, Los Alamos National Laboratory, October 1993. It was unexpected to see up to three orders of magnitude improvement in Kd over Marsh for Americium in acidic conditions, especially since Marsh results suggest improved Kd for Americium in alkaline conditions. For Pu(IV), results were an unexpected 1000 times better using SFMM in an alkaline environment, and for Pu(VI), at least an order of magnitude improvement was realized.

TABLE 11-2

Comparison of SFMM for Radionuclide Removal with Selected Adsorbers

| Radionuclide | Counts Per Minute | | Kd | | |
|---|---|---|---|---|---|
| | | | INVENTION | MARSH | |
| | SFMM | BLANK | SFMM | Acidic | Alkaline |
| Am (III) | 1200 | 30,000 | 3760 | 0.4–8.4 | 10–802 |
| Pu (IV) | 350 | 12,000 | 1660 | 0.4–1173 | 0.4–8.5 |
| $NpO_2$ (V) | 6000 | 13,000 | 59 | NA | NA |
| Pu (VI) | Bckgrnd | 18,000 | >10,000 | 0.4–1173 | 0.4–8.5 |

EXAMPLE 12

An experiment was conducted to demonstrate removal of trichloroethylene (TCE) from wastewater with SFMM. The wastewater was prepared in the lab by saturating water with TCE at a TCE concentration of 1329 ppm.

SFMM materials as in Example 3, but having three different functional molecules were tested for removing TCE from ground water or wastewater. The functional groups were mercaptan (Si65—C3S), $C_{12}$ alkyl chain (Si65—$C_{12}$), and $C_{18}$ alkyl chain (Si65—$C_{18}$). All SFMM materials were mixed with wastewater in a ratio of wastewater volume to weight of SFMM of 100 mL/g. Each test was duplicated.

Results are shown in Table 12-1. The SFMM with mercaptan reduced the TCE from the initial 1329 ppm down to 328 ppm with a decontamination factor of 4. The TCE loading on the mercaptan was about 0.1 g TCE per gram of SFMM. The SFMM with C12 alkyl chain reduced the TCE in water from 1329 ppm to 836 ppm. The SFMM with C18 alkyl chain reduced TCE from 1329 ppm to 1226 ppm.

TABLE 12-1

SFMM Removal of TCE From Water at Room Temperature (ppm)

|  | Si65-C3S | Si65-C3S | Si65-C12 | Si65-C12 | Si65-C18 | Si65-C18 |
|---|---|---|---|---|---|---|
| Initial | 1329 | 1329 | 1329 | 1329 | 1329 | 1329 |
| Final | 328 | 342 | 836 | 916 | 1313 | 1226 |

EXAMPLE 13

An experiment was conducted to demonstrate the bonding of different functional groups on the same functional molecule attached to the mesoporous substrate to enable multiple functionality, such as binding to multiple types of species. Multiple functionality was found to also enhance the functionality already on the surfaces. For instance, by introducing —COOH groups in addition to thiol groups on the same SFMM surface, the SFMM surface binding for cationic species from solutions at neutral pH was increased since the —COOH became negatively charged at this pH.

Table 13-1 shows the results of introducing a mixture of —CH2—CH2—CH2—SH and —CH2—CH2—CH2—NH2 groups to the SFMM surface and the resulting effects on its mercury loading and final solution pH.

TABLE 13-1

Hg Loading of SFMM with 60% SH and 15% NH2 Groups in 0.1 M NaNO3 Solution*

| Sample ID | Vol. Of Solution (ml) | Wt. of SFMM (mg) | Initial Hg Conc. mg/l | Final Hg Conc. mg/l | Hg adsorbed mg/g of SFMM | Initial pH | Final pH |
|---|---|---|---|---|---|---|---|
| 100-Hg-10A | 30 | 10 | 279 | 147 | 396 | 7.72 | 8.54 |
| 100-Hg-10B | 30 | 10 | 279 | 151.0 | 384 | 7.72 | 8.54 |
| 10-Hg-15A | 30 | 15 | 279 | 89.6 | 379 | 7.72 | 8.68 |
| 10-Hg-15B | 30 | 15 | 279 | 72.5 | 413 | 7.72 | 8.65 |
| 01-Hg-30A | 30 | 30 | 279 | 7.3 | 272 | 7.72 | 8.77 |
| 01-Hg-30B | 30 | 30 | 279 | 7.1 | 272 | 7.72 | 8.81 |

*After correction for a total coverage of 75%.

In solutions with pH higher than 4, the possible mercury speciations are $Hg(OH)_2$ and $Hg(OH)^+$ according to Baes and Mesmer (Baes 1976). The $Hg(OH)^+$ species in a $Hg(NO_3)_2$ solution may be the main contributor to the reaction with SFMM:

$Hg(OH)^+ + H-S-SFMM = HO-Hg-S-SFMM + H^+$

The final products with an oxo bridge (Hg—O—Hg) formation on the surface of SFMM are in agreement with the EXAFS measurements. However, the results in Table 13-1 showed a solution pH increase when the SFMM with both —SH and —NH2 groups reacted with $Hg(NO_3)_2$ solution at pH 7.7 (initial pH of Table 13-1). It is known that at pH 7.7 the most of the —$NH_2$ groups become protonated, i.e., —$NH_3^+$.

The SFMM surface with these positively charged —NH3+ will attract more negatively charged $Hg(OH)_3^-$ or neutral $Hg(OH)_2$ species than the positively charged $Hg(OH)^+$:

$Hg(OH)_3^- + H-S-SFMM = HO-Hg-S-SFMM + OH^-$

The reactions at pH 7.7 involve different speciations of mercury and different surface reactions and therefore, may affect its mercury loading.

EXAMPLE 14

An experiment was conducted to demonstrate functionalized mesoporous materials in engineered forms.

(1) Functionalized Mesoporous Spaghetti Using Polysaccharide as Gelling Agent. Mesoporous materials in the form of mesoporous fibers (spaghetti) were prepared and functionalized as described in co-pending U.S. patent application Ser. No. 08/753,573 filed Nov. 26/1996 herein incorporated by reference. Briefly, a pituitous SFMM suspension is drawn into a thin structure from which the liquid portion of the solution is rapidly evaporated. Pituosity is achieved by mixing a low molecular weight polymer with the SFMM suspension.

SFMM fibers were prepared in slurry form containing a dissolved polysaccharide which gels in the presence of specific multivalent ions. A typical recipe contained 2.5 g SFMM, 49.2 g H20, 0.75 g polysaccharide. The slurry was mixed and sonicated for 10 min. The slurry was extruded from a pressurized container through a narrow orifice (2mm diameter) into a gelling salt solution. The gelled, flexible extrudate, typically a few mm wide, was washed for >3 h in flowing water to remove impurity cations, and then evaluated for mercury treatment. This engineered SFMM had a mercury loading of about 340 mg/g.

(2) Mesoporous Beads Using Inorganic Binders

Mesoporous silica beads were prepared as described in co-pending U.S. patent application Ser. No. 08/753,573 filed Nov. 26, 1996 herein incorporated by reference. Briefly, the monomer precursor solution is atomized into fine droplets from which the liquid portion of the monomer precursor solution rapidly evaporates leaving a mesoporous particle or bead.

Inorganic binders were also evaluated with the bead gelation process. A water-soluble alumina-silica cement was added to the slurry and converted to beads. The calcined beads did not show any change in strength. The second binder that was evaluated with the bead gelation process was an attapulgite clay binder. A bead slurry formulation contained 25 wt % attapulgite as an additive was evaluated. The slurry was pH adjusted, and sonicated to yield maximum solids content, about 17–18%, and converted to beads.

A typical recipe was as follows: 0.3 g of polysaccharide was first dissolved in 10.5 g of deionized water to make 10.8 g of the solution. Separately, 16 g of deionized water, 35 g of 0.1 M $NH_4OH$, and 7 g concentrated $NH_4OH$ were mixed. To the ammonia solution mixture, 3.32 g of attapulgite powder (min-u-gel) and 10 g of mesoporous silica were mixed, and sonicated with a horn-sonicator. The resulting slurry was extruded out through a syringe into a salt solution to form gelled droplets. The beads were dried calcined at 650° C.–700° C.

Crushing strength for single beads exceeded 1 kg, indicating sufficient promise as a durable engineering support. Surface areas of calcined beads were 450–460 $m^2/gm$, indicating that sufficient number of surface sites is present for functionalization. Mercury loading tests indicated a mercury loading of 220 mg to 240 mg/g of the beads were achieved. Improvements on surface area by reducing the binding clay to 15% and also by calcination at different temperature is expected to substantially improve the surface area and mercury loading of the bead form.

EXAMPLE 15

In addition to the examples of organic functional molecules to functionalize the available surfaces, an experiment was conducted using inorganic and organometallic reagents as functional molecules to functionalize the available surfaces and the monolayer interfaces.

Phosphine ligands as functional molecules were installed and used to make complexes with transition metals. The phosphine complexes have possible applications in catalysis.

The transition metals (e.g. mercury, molybdenum, iron, etc.) were part of the functional group as adducts of the thiol terminated functional molecule. The function of the transition metal functional group includes use as a hydrogen sulfide scrubber sorbent material. Functional groups of the iron and/or molybdenum thioalkoxide adducts can be used as carbon monoxide scavengers. $NiO^{2+}$, $Cu^{2+}$, and $Co^{2+}$ were bound to SFMM with EDA as the functional group. The SFMM acted as adducts of positively charged Ni, Cu and Co. SFMM is shown in Table 15-1 to be good absorbents for anions as well.

TABLE 15-1

Anion Binding Behavior of SFMM with Inorganic Functional Groups. $ReO_4^-$ in 0.1 M $NaNO_3$ at pH 6.0

| Test ID | Initial Conc. (ppm) | Final Conc. (ppm) | V/g | Kd | Loading (mg/g) |
|---|---|---|---|---|---|
| Re-PPH-T2 | 0.22 | 0.217 | 100 | 1 | 0.000 |
| Re-NI-T2 | 0.22 | 0.14 | 100 | 57 | 0.008 |
| Re-Co-T2 | 0.22 | 0.147 | 100 | 50 | 0.007 |
| Re-Cu-T2 | 0.22 | 0.13 | 100 | 69 | 0.009 |

TABLE 15-2

Anion Binding Behavior of SFMM with Inorganic Functional Groups. Cro2-/4 in 0.1 M $NaNO_3$ at pH 6.0

| Test ID | Initial Conc. (ppm) | Final Conc. (ppm) | V/g | Kd | Loading (mg/g) |
|---|---|---|---|---|---|
| Cr-PNO1 | 10.1 | 1.63 | 200 | 1039 | 1.694 |
| Cr-PNO2 | 10.1 | 0.07 | 200 | 28657 | 2.006 |
| Cr-12HOPO | 10.1 | 10.2 | 200 | −2 | −0.020 |

TABLE 15-2-continued

Anion Binding Behavior of SFMM with Inorganic Functional Groups. Cro2-/4 in 0.1 M $NaNO_3$ at pH 6.0

| Test ID | Initial Conc. (ppm) | Final Conc. (ppm) | V/g | Kd | Loading (mg/g) |
|---|---|---|---|---|---|
| Cr-34HOPO | 10.1 | 1.52 | 200 | 1129 | 1.716 |
| Cr-PPH-T2 | 10.2 | 0.21 | 100 | 4757 | 0.999 |
| Cr-Cu-T2 | 10.2 | 1.02 | 100 | 900 | 0.918 |
| Cr-Co-T2 | 10.2 | 0.15 | 100 | 6700 | 1.005 |
| Cr-Ni-t2 | 10.2 | 0.18 | 100 | 5567 | 1.002 |

TABLE 15-3

Anion Binding Behavior of SFMM with Inorganic Functional Groups. $H_2AsO_4$ in 0.05 M $NanCO_3$ at pH 6.0

| Test ID | Initial Conc. (ppm) | Final Conc. (ppm) | V/g | Kd | Loading (mg/g) |
|---|---|---|---|---|---|
| As-PPt-Ct1 | 8.76 | 8.30 | 80 | 4 | 0.037 |
| As-Cu-Ct1 | 8.76 | 0.63 | 80 | 1027 | 0.650 |
| As-Co-Ct1 | 8.76 | 1.78 | 80 | 314 | 0.558 |
| As-Ni-Ct1 | 8.76 | 2.43 | 80 | 208 | 0.506 |

TABLE 15-4

Anion Binding Behavior of SFMM with Inorganic Functional Groups. $H_2AsO_4^-$ in 0.1 M $NaNO_3$ at pH 6.0

| Test ID | Initial Conc. (ppm) | Final Conc. (ppm) | V/g | Kd | Loading (mg/g) |
|---|---|---|---|---|---|
| As-PPT-T1 | 6.25 | 4.78 | 80 | 25 | 0.118 |
| As-Cu-t1 | 6.25 | 0.64 | 80 | 698 | 0.449 |
| As-Co-t1 | 6.25 | 0.73 | 80 | 610 | 0.442 |
| As-Ni-t1 | 6.25 | 0.96 | 80 | 440 | 0.423 |

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A surface functionalized mesoporous material, comprising:
   (a) a mesoporous material having a plurality of mesopores, and an available hydrated surface, said available hydrated surface having an interior surface and an exterior surface, the mesoporous material characterized by a surface area to mass ratio of at least about 200 $m^2/g$; and
   (b) a first plurality of functional molecules containing functional groups attached to said available hydrated surface, wherein an amount of said first plurality of functional molecules upon said available hydrated surface is at least greater than about 10% of a total possible number of functional molecules attachable to said available hydrated surface.

2. The surface functionalized mesoporous material as recited in claim 1, wherein said plurality of mesopores are substantially monodisperse.

3. The surface functionalized mesoporous material as recited in claim 1, wherein said first plurality of functional molecules are selected from the group of organic molecules, inorganic molecules, and combinations thereof.

4. The surface functionalized mesoporous material as recited in claim 3, wherein said organic molecules are selected from the group consisting of mercaptan, amines, pyridines, alkyls, polymers, methyl, halogen, nitrile, and combinations thereof.

5. The surface functionalized mesoporous material as recited in claim 3, wherein said organic molecules are organometallic molecules.

6. The surface functionalized mesoporous material as recited in claim 3, wherein said inorganic molecules are selected from the group consisting of metal salts, metal alkoxides, and combinations thereof.

7. The surface functionalized mesoporous material as recited in claim 1, wherein said functional molecules impart elasticity to the plurality of mesopores.

8. The surface functionalized mesoporous material as recited in claim 1, further comprising a second plurality of functional molecules attached to said first plurality of functional molecules and extending therefrom.

9. The surface functionalized mesoporous material as recited in claim 1, wherein said functionalized interior surface defines an open pore having a diameter of at least 1 Angstrom.

10. The surface functionalized mesoporous material as recited in claim 1, wherein said mesoporous material has a form selected from the group consisting of powder, fiber, film, bead, disc, and combinations thereof.

11. The surface functionalized mesoporous material as recited in claim 1, wherein said functional group is selected from the group consisting of phosphine, thiol, thioalkoxide, and combinations thereof.

12. The surface functionalized mesoporous material as recited in claim 1, enclosed in another material.

13. A method of attaching a first plurality of functional molecules containing specific functional groups on an available surface including within pores of a mesoporous material, the method comprising the steps of:
 (a) hydrating the mesoporous material followed by;
 (b) mixing the mesoporous material with a first plurality of precursor functional molecules;
 (c) stirring for a predetermined time permitting permeation of the precursor functional molecules throughout the pores; and
 (d) forming a surface functionalized mesoporous material wherein said precursor functional molecules are attached to said available surface.

14. The method as recited in claim 13, wherein the step of forming comprises the step of:
 heating the stirred mixture at reflux at a predetermined temperature for a predetermined time and forming the surface functionalized mesoporous material.

15. The method as recited in claim 13, wherein hydrating comprises the steps of:
 (a) conditioning a surface of each of said plurality of pores by placing said mesoporous material into water and heating said water to a predetermined temperature for a predetermined time sufficient to condition said surface, said water having a monolayer amount and an excess amount; and
 (b) removing said excess amount from said plurality of pores and leaving at least one layer of water molecules on said surface, leaving a hydrated mesoporous material.

16. The method as recited in claim 15, wherein said predetermined temperature is about 100° C.

17. The method as recited in claim 15, wherein said predetermined time is about 4 hours.

18. The method as recited in claim 15, wherein said removing is by azeotropic distillation.

19. The method as recited in claim 18, wherein said azeotropic distillation is with a distillation solvent selected from the group consisting of benzene, toluene, chloroform, and combinations thereof.

20. The method as recited in claim 15, wherein said removing is by standard distillation.

21. The method as recited in claim 13, wherein said permeation is with a solvent.

22. The method as recited in claim 21, further comprising the steps of:
 (a) washing the surface functionalized mesoporous material to remove any by-products of the functionalization and removing remaining solvent; and
 (b) drying the washed material.

23. The method as recited in claim 21, wherein said removing is by azeotropic distillation.

24. The method as recited in claim 23, wherein said azeotropic distillation is with a distillation solvent selected from the group consisting of benzene, toluene, chloroform, and combinations thereof.

25. The method as recited in claim 13, wherein said hydrating comprises the steps of:
 (a) mixing said mesoporous material in water with a distillation solvent, said water in a monolayer amount; and
 (b) stirring said mixture for a predetermined time and permitting said water to hydrate available surface.

26. The method as recited in claim 13, wherein said hydrating comprises the steps of:
 (a) mixing said mesoporous material in water, said water in a monolayer amount; and
 (b) heating and pressurizing the mixture for a predetermined time and permitting said water to hydrate said available surface.

27. The method as recited in claim 13, wherein said hydrating comprises the steps of:
 (a) placing said mesoporous material into a closed vessel, and
 (b) introducing heated and pressurized water vapor into said closed vessel, said water vapor in a monolayer amount.

28. A method for separating a target material from a material mixture, comprising the steps of:
 (a) attaching the first plurality of functional molecules as recited in claim 14,
 (b) binding said target material to said first plurality of functional molecules; and
 (c) enclosing the bound target material in another material.

* * * * *